United States Patent
Takeda et al.

(10) Patent No.: US 10,113,220 B2
(45) Date of Patent: Oct. 30, 2018

(54) HIGH STRENGTH, HOT DIPPED GALVANIZED STEEL SHEET EXCELLENT IN SHAPEABILITY AND METHOD OF PRODUCTION OF SAME

(71) Applicant: NIPPON STEEL & SUMITOMO METAL CORPORATION, Tokyo (JP)

(72) Inventors: Kengo Takeda, Tokyo (JP); Kazuhisa Kusumi, Tokyo (JP); Haruhiko Eguchi, Tokyo (JP); Jun Hirowatari, Tokyo (JP); Shintarou Fujii, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 197 days.

(21) Appl. No.: 14/857,578

(22) Filed: Sep. 17, 2015

(65) Prior Publication Data

US 2016/0002756 A1 Jan. 7, 2016

Related U.S. Application Data

(63) Continuation of application No. 13/635,805, filed as application No. PCT/JP2011/058749 on Mar. 31, 2011, now Pat. No. 9,228,244.

(30) Foreign Application Priority Data

Mar. 31, 2010 (JP) .................. 2010-083390

(51) Int. Cl.
| | |
|---|---|
| *C22C 38/38* | (2006.01) |
| *C21D 6/00* | (2006.01) |
| *C21D 8/04* | (2006.01) |
| *C21D 9/46* | (2006.01) |
| *C22C 38/00* | (2006.01) |
| *C22C 38/02* | (2006.01) |
| *C22C 38/06* | (2006.01) |
| *C22C 38/28* | (2006.01) |
| *C23C 2/06* | (2006.01) |
| *C23C 2/28* | (2006.01) |
| *B32B 15/01* | (2006.01) |
| *C22C 38/24* | (2006.01) |
| *C22C 38/26* | (2006.01) |
| *C22C 38/32* | (2006.01) |
| *C22C 38/22* | (2006.01) |

(52) U.S. Cl.
CPC ............ *C22C 38/38* (2013.01); *B32B 15/013* (2013.01); *C21D 6/00* (2013.01); *C21D 8/0405* (2013.01); *C21D 8/0447* (2013.01); *C21D 8/0473* (2013.01); *C21D 9/46* (2013.01); *C22C 38/001* (2013.01); *C22C 38/002* (2013.01); *C22C 38/008* (2013.01); *C22C 38/02* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C23C 2/06* (2013.01); *C23C 2/28* (2013.01); *C21D 2211/005* (2013.01); *C21D 2211/008* (2013.01)

(58) Field of Classification Search
CPC ...................................................... C22C 38/38
See application file for complete search history.

(56) References Cited

U.S. PATENT DOCUMENTS

| | | | |
|---|---|---|---|
| 2003/0196735 A1 | 10/2003 | Sugiura et al. | |
| 2006/0231176 A1* | 10/2006 | Takagi | C21D 8/0436 |
| | | | 148/603 |
| 2007/0190353 A1 | 8/2007 | Taniguchi et al. | |
| 2010/0037995 A1 | 2/2010 | Watanabe | |

(Continued)

FOREIGN PATENT DOCUMENTS

| | | |
|---|---|---|
| JP | 06-145788 A | 5/1994 |
| JP | 10-147838 A | 6/1998 |
| JP | 11-279693 A | 10/1999 |

(Continued)

OTHER PUBLICATIONS

Bramfitt, Bruce L. Benscoter, Arlan O.. (2002). Metallographer's Guide—Practices and Procedures for Irons and Steels—1. Introduction to Steels and Cast Irons. ASM International.*
International Search Report for PCT/JP2011/058749 dated Jul. 12, 2011.
U.S. Office Action dated Feb. 26, 2015 for U.S. Appl. No. 13/635,805.
U.S. Office Action dated Jun. 17, 2015 for U.S. Appl. No. 13/635,805.

*Primary Examiner* — Jessee R Roe
*Assistant Examiner* — Jophy S. Koshy
(74) *Attorney, Agent, or Firm* — Birch, Stewart, Kolasch & Birch, LLP

(57) ABSTRACT

A high strength hot dipped galvanized steel sheet is provided. By controlling the amount of addition of Ti instead of the addition of Nb or B, it is possible to obtain an effect of retarding recrystallization and grain growth even if annealing by a continuous annealing process in a temperature range of the general annealing temperature of 720° C. to a temperature of the lower of 800° C. or Ac3 temperature. By controlling the rolling and heat treatment conditions, it is possible to control the ferrite phase rate, grain size of the low temperature transformed phases, ratio of average values of the nano hardnesses of the ferrite phase and low temperature transformed phases, and fluctuations of hardnesses of the low temperature transformed phases in a composite structure steel of ferrite and low temperature transformed phases and obtain a high strength hot dipped galvanized steel sheet.

3 Claims, 1 Drawing Sheet

(56) References Cited

U.S. PATENT DOCUMENTS

2011/0315279 A1 12/2011 Kaneko et al.
2013/0048155 A1 2/2013 Kaneko et al.

FOREIGN PATENT DOCUMENTS

| JP | 2002-363685 A | 12/2002 |
| JP | 2002-363695 A | 12/2002 |
| JP | 2007-9317 A | 1/2007 |
| JP | 2008-111162 A | 5/2008 |
| JP | 2009-144225 A | 7/2009 |
| JP | 2009-144251 A | 7/2009 |
| JP | 2009-167467 A | 7/2009 |
| JP | 2009-167475 A | 7/2009 |
| JP | 2009-191360 A | 8/2009 |
| JP | 2010-65316 A | 3/2010 |
| WO | WO 2010/103936 A1 | 9/2010 |
| WO | WO 2011/090184 A1 | 7/2011 |

* cited by examiner

HIGH STRENGTH, HOT DIPPED GALVANIZED STEEL SHEET EXCELLENT IN SHAPEABILITY AND METHOD OF PRODUCTION OF SAME

CROSS REFERENCE TO RELATED APPLICATIONS

This application is a Continuation of copending application Ser. No. 13/635,805, filed on Sep. 18, 2012, which was filed as the national phase under 35 U.S.C. § 371 of PCT International Application No. PCT/JP2011/058749 on Mar. 31, 2011, which claims priority to Patent Application No. 2010-083390, filed in Japan on Mar. 31, 2010, all of which are hereby expressly incorporated by reference into the present application.

TECHNICAL FIELD

The present invention relates to high strength, hot dipped galvanized steel sheet excellent in shapeability which is mainly suitable for auto parts and a method of production of the same.

BACKGROUND ART

Reduction of weight of the cross members, side members, and other members of automobiles has been considered so as to deal with the trend toward reduction of weight for improvement of fuel economy in recent years. In terms of materials, from the viewpoint of securing strength and impact safety even if made thinner, steel sheet is being made higher in strength. However, the shapeability of materials deteriorates along with the rise of strength, so to achieve lighter weight of the members, steel sheet which satisfies both shapeability and high strength has to be produced.

As steel sheet which achieves both shapeability and high strength, PLT 1 discloses the art of utilizing residual austenite and using transformation-induced plasticity to improve the ductility, so-called residual austenite steel. However, to enable residual austenite to remain, the cooling rate after dual-phase annealing has to be increased to prevent ferrite transformation and pearlite transformation and Si and Al have to be added to suppress the precipitation of cementite. To make the cooling rate greater, a continuous annealing line with a high cooling rate becomes necessary. Addition of a high content of Si impairs the plateability, while a high content of Al often impairs the castability.

PLT 2 and PLT 3 disclose so-called "dual phase steel" which has a composite structure of low temperature transformed phases which contain ferrite and martensite (hereinafter referred to as "DP steel"). This is being widely used. DP steel exhibits a sufficient strength-ductility balance, through not reaching that of residual austenite steel, so is used for relatively complicatedly shaped chassis parts. Further, the strength of DP steel is increasing along with the trend toward lighter weight of chasses in recent years.

For example, PLT 4 and PLT 5 disclose the art of adding the carbide-forming elements of Nb, Ti, and other elements to suppress recrystallization during annealing and utilize precipitation strengthening so as secure a tensile strength of 780 MPa or more.

Further, PLT 6 and PLT 7 relate to composite structure steels, where the stretch flange formability is generally low in level, and show the art of controlling the difference in hardnesses of the base phase ferrite and the low temperature transformed phases so as to improve the stretch flange formability. In these inventions, the hardness is measured by the Vicker's hardness.

However, in the case of DP steel with a tensile strength of 780 MPa or more, the grain size of the microstructure is small and the hardness cannot be evaluated by the Vicker's hardness. Therefore, art which evaluates properties by the nano hardness which is measured using the newly developed art of nano indentation is disclosed in PLT 8. With this art, the ratio of hardnesses of the ferrite and the low temperature transformed phases is defined in accordance with the ferrite fraction. Due to this, the bending properties are improved.

CITATIONS LIST

Patent Literature

PLT 1: Japanese Patent Publication (A) No. 6-145788
PLT 2: Japanese Patent Publication (A) No. 10-147838
PLT 3: Japanese Patent Publication (A) No. 2002-363695
PLT 4: Japanese Patent Publication (A) No. 2009-144225
PLT 5: Japanese Patent Publication (A) No. 2002-363685
PLT 6: Japanese Patent Publication (A) No. 2009-191360
PLT 7: Japanese Patent Publication (A) No. 2009-167475
PLT 8: Japanese Patent Publication (A) No. 2009-167467
PLT 9: Japanese Patent Publication (A) No. 2010-65316

SUMMARY OF INVENTION

Technical Problem

When producing DP steel utilizing microalloy elements, the precipitation behavior of Ti, Nb, and other microalloy carbides has an effect on the material quality. That is, the material quality sometimes fluctuates due to the production conditions of steel sheet, in particular the annealing conditions. The fluctuations in the material quality in this case mainly appear in the yield strength and the stretch flange formability.

When the yield strength fluctuates, there are the problems that the springback behavior changes after press forming and the dimensional precision of chassis parts falls. For this reason, defective parts occur and correction off-line becomes necessary.

If the stretch flange formability fluctuates, there is the problem of cracking at the sheared parts which are produced by blanking at the time of press forming.

In the past, the element which has been used most as a microalloy is Nb. Nb, even in the solid solution state, retards ferrite grain growth or recrystallization due to the solute dragging effect and contributes to strengthening due to non-recrystallized ferrite and increased grain fineness. Furthermore, when precipitated as carbides, there is an effect of improvement of strength due to precipitation strengthening. Due to these reasons, Nb has been used for improving strength.

Further, if adding B to this, the solute dragging effect of Nb is improved and the strength raising effect becomes larger.

However, with addition of Nb and further with addition of Nb and B, the effect of retarding recrystallization and the effect of suppressing grain growth are large, so a high annealing temperature becomes necessary. For this reason, in the general temperature range of continuous annealing, that is, 720° C. to 800° C. in range, recrystallization is not completed and the dependency of the tensile strength or other aspects of material quality on the annealing temperature ends up become larger.

Further, the art which is disclosed in PLT 8 for restriction of the ratio of the nano hardnesses of the ferrite phase and low temperature transformed phases to improve the bendability just defines the ratio of the average hardnesses. For this reason, even if there is a phase of a high hardness in the low temperature transformed phases, sometimes this ends up being included in the average value with the surroundings. When there is such a high hardness low temperature transformed phase, this becomes a cause of fluctuations of stretch flange formability and further becomes a cause of fluctuations of the tensile characteristics, so this is a problem.

PLT 9 discloses a composite structure steel sheet which has ferrite as a main phase and bainite and martensite low temperature transformed phases as secondary phases wherein the balances of TS-EL and TS-λ (measure for evaluation of stretch flange formability) are good. This discloses the deliberate addition of Ti and Nb, control of the ratios of composition of the secondary phases, and control of the hardness of the base material structure. However, in this case, an Ac3 temperature or higher annealing temperature becomes necessary, so the annealing temperature dependency is large.

In this way, keeping the material quality from fluctuating due to the manufacturing conditions is an important requirement for DP steel. In particular, DP steel which does not fluctuate in material quality under high productivity annealing conditions, for example, even in the general temperature range in continuous annealing, that is, 720° C. to 800° C. in range, or at most annealing at the Ac3 temperature or less, is being sought.

Solution to Problem

The inventors engaged in in-depth studies to solve the above problems and as a result discovered that by adding Ti, which is smaller in the effect of retarding recrystallization and grain growth compared with Nb and which enables recrystallization in the general temperature range in continuous annealing, that is, 720° C. to 800° C. in range, and by limiting the amounts of addition of Nb and B, it is possible to suppress fluctuations in the material quality.

That is, they discovered that even if annealing at a temperature range of 720° C. to a temperature of the lower of 850° C. or the Ac3 temperature (below, referred to as the "easy annealing temperature region") without heating to the annealing Ac3 temperature, it is possible to suppress fluctuations in material quality while obtaining predetermined properties.

Further, the inventors discovered that by optimizing the heating rate and the cooling pattern at the time of annealing, it is possible to control the ferrite phase rate, the grain size of the low temperature transformed phases, the ratio of the average values of nano hardnesses of the ferrite phase and the low temperature transformed phases, and fluctuations in hardnesses of the low temperature transformed phases.

Due to these findings, the inventors discovered that it is possible to produce high strength, hot dipped galvanized steel sheet with little fluctuations in material quality and completed the present invention. The gist of the present invention is as follows:

[1] High strength, hot dipped galvanized steel sheet characterized by containing, as ingredients of the steel, by mass %, C: 0.05 to 0.1%, Si: 0.1 to 1.0%, Mn: 2.0% to 2.5%, Al: 0.02 to 0.1%, Ti: 0.01 to 0.05%, Cr: 0.1 to 1.0%, Sn: 0.0010 to 0.1%, and a balance of Fe and unavoidable impurities, having a microstructure comprised of low temperature transformed phases of a ferrite phase fraction of 70 to 90% and a balance of martensite, having an average grain size of the low temperature transformed phases of 0.1 to 1 µm, having a ratio of average nano hardnesses of the ferrite phase and the low temperature transformed phase of 1.5 to 3.0, and having a nano hardness of the low temperature transformed phases at 80% or more of the measurement points of 1 to 5 times the average nano hardness of the ferrite phase.

[2] A method of production of high strength, hot dipped galvanized steel sheet characterized by heating a slab which has the steel ingredients as set forth in [1] to 1000 to 1350° C., then hot rolling at a final rolling temperature Ar3 or more, coiling at 600° C. or less, pickling, cold rolling at a rolling rate of 30 to 70%, and, after that, heat treating while making a temperature of 720° C. to a temperature of the lower of 850° C. or the Ac3 temperature the annealing temperature, during which heating in the temperature range from at least 600° C. to the annealing temperature by a 0.5° C./sec to 6° C./sec heating rate, holding at the annealing temperature for 10 sec or more, then cooling in at least the temperature range of the annealing temperature to 650° C. by a cooling rate of 5° C./sec or more, further cooling in at least the temperature range of 600° C. to 500° C. by a cooling rate of 3° C./sec or less, then performing hot dip galvanization or hot dip galvannealization. The annealing temperature is made the 850° C. or Ac3 temperature or less because if heating over these temperatures, the steel sheet strength rapidly falls and the runnability at the annealing step becomes poor.

Advantageous Effects of Invention

According to the present invention, in the continuous annealing step, even if annealing in the temperature range of the general annealing temperature of 720° C. to a temperature of the lower of 850° C. or the Ac3 temperature (easy annealing temperature region), it is possible to provide high strength, hot dipped galvanized steel sheet which has little fluctuation in material quality, which is excellent in shapeability, and which has predetermined properties. In particular, a remarkable effect is exhibited in 780 MPa or more high strength, hot dipped galvanized steel sheet.

DESCRIPTION OF EMBODIMENTS

The basic thinking of the present invention will be explained.

The steel sheet according to the present invention limits the addition of carbide-forming elements to Ti, does not add the conventionally often used Nb, and, further, limits the amount of addition of B—which has a great effect on recrystallization.

Further, the method of production of steel sheet according to the present invention is characterized by optimizing the heating rate at the time of annealing and the cooling rate after annealing so as to control the ferrite phase rate, the grain size of the low temperature transformed phases, the ratio of the average values of the nano hardnesses of the ferrite phase and the low temperature transformed phases, and the fluctuations in the hardnesses of the low temperature transformed phases. Due to this, they discovered that high strength hot dipped galvanized steel sheet with little fluctuations in material quality can be produced.

First, the reasons for limiting the carbide-forming elements which contribute to the recrystallization of ferrite and precipitation strengthening to Ti and for limiting the contents of the carbide-forming elements will be shown below.

Nb is an element effective for suppression of recrystallization and precipitation strengthening. The precipitation behavior at the time of hot rolling greatly depends on the coiling temperature. Further, even in the case of fine precipitation at the time of heating of the annealing step, the effect of retardation of recrystallization is large, so the material quality of the annealed steel sheet is believed to greatly depend on the annealing temperature.

The same is true for the V, W, Mo, and Zr which are used as other carbide-forming elements. Further, the dependency of the carbide precipitation on the coiling temperature in hot rolling and the dependency on the heating rate and dependency on the annealing temperature in the annealing process differ, so become causes of fluctuation of the material quality.

Ti, compared with Nb, has a small effect of retardation of recrystallization or grain growth due to the solute dragging effect or the effect of precipitation strengthening due to carbides. For this reason, in the temperature range where manufacture is easy in general continuous annealing, that is, 720° C. to 800° C. in range, the dependency of the tensile strength and other facets of material quality on the annealing temperature becomes small. A conceptual view is shown in FIG. 1.

Figure 1:
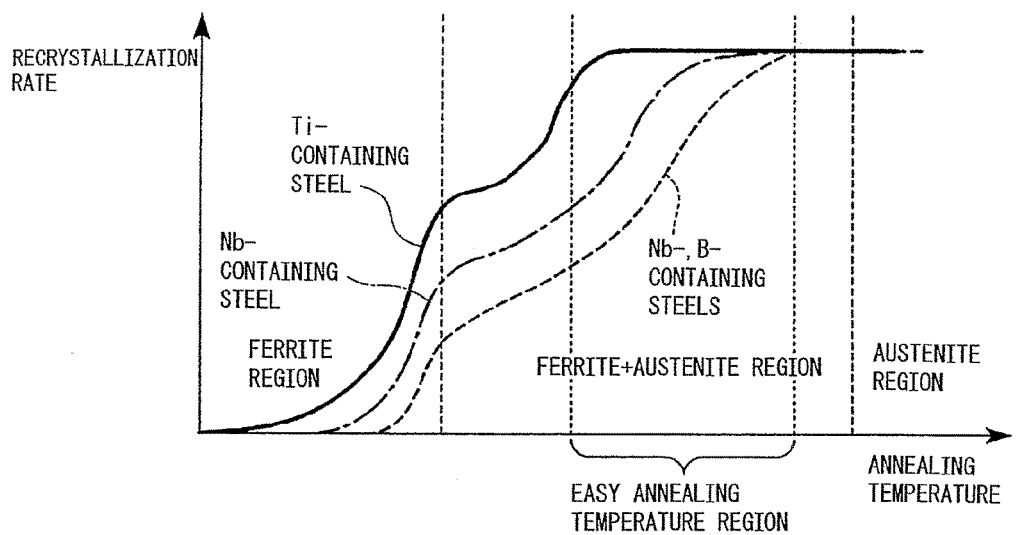
FIG. 1 is a graph which shows the relationship between the recrystallization rate and annealing temperature of Ti-containing steel, Nb-containing steel, and Nb—B-containing steel.

As shown in FIG. 1, in Ti-containing steel, it is believed that recrystallization starts at a temperature in the ferrite region and that the austenite transformed to when reaching the dual phase region of ferrite and austenite retards the recrystallization. If raising the temperature after that, the recrystallization ends. Due to this, with Ti-containing steel, compared with Nb-containing steel and Nb—B-containing steel, it is possible to obtain a comparatively low temperature, stable recrystallized state. That is, it is believed possible to reduce the fluctuations in material quality. Due to the above reasons, the carbide-forming elements are limited to only Ti.

Further, B retards the ferrite transformation and pearlite transformation at the time of cooling after annealing. Therefore, this is an effective element for obtaining a composite structure. However, the effect of suppression of transformation is large, so the steel sheet after hot rolling is hard and cold rolling sometimes becomes difficult. Further, as shown by the example of the Nb—B-containing steel of FIG. 1, recrystallization in the easy annealing temperature region is suppressed, so the annealing temperature has to be raised. For this reason, the amount of addition of B was limited. A conceptual view of the retardation of recrystallization in Nb—B-containing steel is shown together in FIG. 1.

To control the fine precipitation of Ti during the heating of the annealing step, limitation of the amount of addition of Ti and the hot rolling conditions, in particular the coiling temperature, is effective. Furthermore, by limiting the heating rate by the heating during the annealing step, the retardation of the recrystallization is suppressed and the fluctuations in the material quality can be reduced.

Ti precipitates as TiN in an amount corresponding to mainly the amount of addition of N at the time of heating for hot rolling. The remaining Ti precipitates as TiC at the time of coiling, so the coiling temperature is limited to suppress fine precipitation. The Ti which did not form any precipitates at the time of hot rolling, that is, the solid solution Ti, is believed to finely precipitate as TiC at the time of heating in the annealing step or remain in the form of solid solution Ti so as to suppress recrystallization and grain growth.

Next, control of the low temperature transformed phases will be explained. The grain size of the low temperature transformed phases, the ratio of hardnesses of the low temperature transformed phases and ferrite phase, and the ranges of their fluctuations were controlled. In DP steel, the tensile strength is greatly affected by the strength of the low temperature transformed phases. That is, when the hardnesses of the low temperature transformed phases are high, the tensile strength becomes high. For this reason, fluctuations in the hardnesses of the low temperature transformed phases become the cause of fluctuations in the tensile strength. The hardnesses of the low temperature transformed phases depend on the concentration of carbon in the austenite at the time of annealing. Further, if the amount of carbon fluctuates, the transformation expansion rate fluctuates and the amount of movable dislocations which are introduced into the nearby ferrite is affected. For this reason, by limiting the ratio of hardnesses of the low temperature transformed phases and the ferrite phase and the ranges of their fluctuation, it is possible to suppress the fluctuation of the yield strength.

The ratio of hardnesses of the low temperature transformed phases and the ferrite phase also has an effect on the stretch flange formability. With DP steel, voids are formed from near the low temperature transformed phases and act as the starting points of cracks. If the ratio of hardnesses of the low temperature transformed phases and the ferrite phase is large, even if the strain is small, voids easily form. From the viewpoint of this stretch flange formability, the ratio of hardnesses is preferably small.

However, if the ratio of hardnesses is excessively small, the expansion of volume when the low temperature transformed phases transform will be small, so the amount of movable dislocations which are introduced into the ferrite becomes smaller. In this case, the low yield ratio characterizing DP steel can no longer be realized.

The hardnesses of the low temperature transformed phases depend on the concentration of carbon in the austenite. If the distribution of carbon in the austenite becomes excessively uneven, the fluctuations in hardnesses of the low temperature transformed phases become greater and, along with this, the fluctuations in the yield strength and stretch flange formability become greater. For this reason, control of the extent of fluctuation of the hardnesses of the low temperature transformed phases is important in controlling fluctuations in material quality.

The low temperature transformed phases are preferably fine in grain size and dispersed in large amounts. The reasons are that voids are not locally formed at the time of stretch flange formation, so this is advantageous, and that fine dispersion results in uniform introduction of movable dislocations into the ferrite.

The ratio of hardnesses of the low temperature transformed phases and the ranges of fluctuation and grain size can be controlled by the heating rate and the cooling rate in the annealing step. The thinking is shown below.

First, the heating rate will be explained. In the heating step of annealing, melting of the iron carbides, recovery of the ferrite, and recrystallization occur near 600° C. or more and the ferrite transforms to austenite at the Ac1 transformation point near 700° C. or more. The melting of iron carbides is promoted by lowering the heating rate, while the distribution of carbon is made uniform. If ferrite is transformed to austenite, the recrystallization of ferrite is suppressed. For this reason, by limiting the heating rate in the temperature region from 600° C. to the annealing temperature, it is possible to control the recrystallization rate.

The fractions of ferrite and austenite are determined by the annealing temperature, while carbon etc. concentrates at the austenite. Further, due to limitations on the heating rate, the amount of addition of Ti, and the coiling temperature at hot rolling, the recrystallization of ferrite is controlled and the ratio of hardnesses of the ferrite and low temperature transformed phases is held at a suitable range.

Next, with cooling after annealing, the sheet is cooled relatively fast in the temperature range from the annealing temperature down to 650° C. so as to increase the nucleation sites of transformation and make the low temperature transformed phases finer. Further, by cooling relatively slowly over the temperature range from 600° C. to 500° C., it is possible to reduce the fluctuations of the amount of carbon in the austenite which is distributed by ferrite transformation.

Next, the reasons for limitation of the specific conditions will be explained.

First, the limitations of the chemical ingredients will be explained. Note that unless particularly indicated, "%" means mass %.

C: C is an element which can raise the strength of the steel sheet. However, if less than 0.05%, the hardness of the mainly martensite low temperature transformed phases becomes lower, so securing the 780 MPa or more tensile strength becomes difficult. On the other hand, if over 0.1%, securing the spot weldability becomes difficult. For this reason, the range is limited to 0.05 to 0.1%. To reliably obtain this effect, the lower limit value is preferably made 0.06%, more preferably 0.07%, if possible preferably 0.075%. Further, the upper limit value is preferably made 0.095%, if possible preferably 0.09%.

Si: Si is a strengthening element and is effective for raising the strength of the steel sheet. However, if less than 0.1%, the drop in shapeability due to deterioration of the elongation becomes remarkable. Further, if over 1%, the plating wettability falls. Therefore, the Si content is restricted to 0.1 to 1.0% in range. To obtain this effect reliably, the lower limit value is preferably made 0.25%, more preferably 0.3%, if possible 0.4%. Further, the upper limit value is preferably 0.8%, if possible 0.6%, more preferably 0.5%. For a continuous hot dip galvanization line which has an all radiant tube type heating furnace, 0.4 to 0.5% is most suitable.

Mn: Mn is a strengthening element and is effective for raising the strength of the steel sheet. However, if less than 2.0%, obtaining a 780 MPa or higher tensile strength is difficult. If conversely large, it aids co-segregation with P and S and invites a remarkable deterioration in the bendability, elongation, and hole expandability, so 2.5% is made the upper limit. To reliably obtain this effect, the lower limit value is preferably 2.1%, more preferably 2.2%. The upper limit value is preferably 2.4%, more preferably 2.3%.

Ti: Ti is an important element which contributes to the rise in strength of steel sheet by suppression of growth of ferrite crystal grains and therefore grain size reduction strengthening and dislocation strengthening. It hardens the main phase ferrite and lowers the difference in hardnesses of the strengthening phases, that is, the mainly martensite low temperature transformed phases and ferrite phase so as to improve the bendability and hole expandability. These effects cannot be obtained if less than 0.01%, so the lower limit value was made 0.01%.

On the other hand, if containing over 0.05%, the precipitation of carbonitrides becomes greater and the shapeability deteriorates, so the upper limit value is made 0.05%. To make the effect reliable, the lower limit value is preferably made 0.015% and more preferably is made 0.02%. The upper limit value is preferably 0.04%, more preferably 0.03%. If making the tensile strength 780 MPa or more and reducing the fluctuations in the yield strength, the lower limit value should be limited to 0.02% and the upper limit value to 0.03%.

Cr: Cr is a strengthening element and is important for improvement of hardenability. It is an austenite former, so is an element essential for securing the austenite fraction at a low temperature. If less than 0.1%, these effects cannot be obtained, so the lower limit value was made 0.1%. Conversely, if containing over 1%, the strength excessively increases, so the upper limit value was made 1%. Preferably, the content is made 0.2 to 0.8%, more preferably 0.3 to 0.7%.

Al: Al promotes formation of ferrite and improves the ductility, so may be added. Further, it may also be utilized as a deoxidizing material. The effect is not exhibited if less than 0.02%, so the lower limit was made 0.02%. However, excessive addition forms Al-based coarse inclusions and becomes a cause of surface damage and deterioration of hole expandability. Due to this, the upper limit of addition of Al was made 0.1%. Preferably, the content is 0.04 to 0.09%, more preferably 0.05 to 0.08%.

P: P tends to segregate at the center part of thickness of the steel sheet and causes the weld zone to become brittle. For this reason, the smaller the amount the better, but zero is rather better. If over 0.03%, the embrittlement of the weld zone becomes remarkable, so the suitable range is limited to 0.03% or less. The lower limit value of P is not particularly set, but making the content less than 0.0001 mass % would be disadvantageous economically, so this value is preferably made the lower limit value. That is, the content which is allowed as an unavoidable impurity is made 0.03% or less.

S: S has a detrimental effect on the weldability and on the manufacturability at the time of casting and time of hot rolling. For this reason, the smaller the amount the better, but zero is rather better. Due to this, the upper limit value was made 0.01 mass % or less. The lower limit value of S is not particularly set, but making the content less than 0.0001% is disadvantageous economically, so this value is preferably made the lower limit value. That is, the content which is allowed as an unavoidable impurity is made 0.01% or less.

N: N forms coarse nitrides and causes deterioration of the bendability and hole expandability, so the amount of addition must be kept down. Zero is rather better. This is because if N is over 0.01%, this tendency becomes remarkable, so the range of N content is made 0.01% or less. In addition, this becomes a cause of occurrence of blowholes at the time of welding, so the less the better. The lower limit is not particularly set. The effect of the present invention is exhibited, but making the N content less than 0.0005% invites a major increase in the manufacturing costs, so this is the substantive lower limit. That is, the content which is allowed as an unavoidable impurity is 0.01% or less.

Nb: Nb is an element which has an effect of suppression of recrystallization and is effective for refining the ferrite and strengthening the ferrite phase due to precipitation strengthening. However, it precipitates as NbC during rolling and in the coiling step at the time of hot rolling and during the heating of the annealing step to thereby affect the precipitation strengthening and suppression of recrystallization. Even as solid solution Nb, due to the solute dragging effect, it affects the suppression of recrystallization, so greatly affects the strength. Therefore, it is susceptible to the effects of the production process and becomes a cause of fluctuations in material quality. Addition is therefore not preferred. Therefore, in the present invention, this is not deliberately added. Even if present, the content is preferably limited to 0.0010% or less. This limitation is set because even in the case of basically zero addition, considering the case that utilization of scraps results in this element ending up being included, it is preferable to control the content to this limitation or less. That is, the content which is allowed as an unavoidable impurity is made 0.0010% or less.

V, W, Mo, and Zr: These carbide-forming elements are characterized by greater difficulty in forming precipitates compared with Ti and Nb. If these elements are added, they become causes of fluctuation of material quality since the precipitation behaviors differ for the respective elements and the dependency of the carbide precipitation on the coiling temperature and the dependency on the heating rate or dependency on the annealing temperature change in the annealing step. For this reason, addition is not preferable. Therefore, in the present invention, V, W, Mo, and Zr are not deliberately added. Even if present, their contents are preferably restricted to 0.0010% or less. This limitation is set because even in the case of basically zero addition, considering the case that utilization of scraps results in these elements ending up being included, it is preferable to control the contents to this limitation or less. That is, the contents which are allowed as unavoidable impurities are made 0.0010% or less.

B: B is an element which makes the quenchability increase and is also effective for suppression of recrystallization. However, due to the addition of B, the strength of the hot rolled steel sheet rises and the cold rollability falls. Further, to suppress the recrystallization of ferrite, the annealing temperature has to be raised. Zero addition is preferable. Therefore, in the present invention, this is not deliberately added. Even if present, the content is preferably limited to 0.0001% or less. This limitation is set because even in the case of basically zero addition, considering the case that utilization of scraps results in this element ending up being included, it is preferable to control the content to the limitation or less. That is, the content which is allowed as an unavoidable impurity is made 0.0001% or less.

Sn: Sn improves the plating adhesion at the time of hot dip galvanization and further has the effect of promoting alloying. The effect is not exhibited if less than 0.0010%, so the lower limit was made 0.0010%. Further, if excessively added, the hot workability of the slab falls, so the upper limit was made 0.1% or less. To reliably obtain this effect, the lower limit value is preferably made 0.002% and the upper limit value is preferably made 0.03%. Furthermore, the lower limit value is more preferably made 0.005% and the upper limit value is more preferably made 0.01%.

As other elements, Ca or an REM may also be added for control of the form of the sulfides. Further, sometimes Ni, Cu, and other elements are contained as unavoidable impurities, but any content is possible so long as the content does not have any effect of the properties of the present invention.

The contents of these elements are preferably, as a general measure, 0.05% or less for the respective elements.

Next, the reasons for limitation of the microstructure will be explained.

The ferrite phase fraction is made 70 to 90% and the balance is made martensite and other low temperature transformed phases. By making this ratio, a tensile strength of 780 MPa or more and a predetermined ductility are secured. If the ferrite phase fraction is less than 70%, the ductility due to ferrite cannot be secured. If the ferrite phase fraction is over 90%, the content of the low temperature transformed phases is small, so the tensile strength falls below 780 MPa. The ferrite phase fraction is preferably 75 to 88%, more preferably 80 to 85%.

The low temperature transformed phases are made to contain martensite so as to enable use of martensite transformation to cause movable dislocations to be introduced into the ferrite phase and the yield point to fall and to secure a yield ratio of 0.7 or less.

The low temperature transformed phases are preferably finely dispersed in large amounts. Due to this, not only does the stretch flange formability become excellent, but also the introduction of movable dislocations in the ferrite phase becomes uniform. However, if the average grain size of the low temperature transformed phases is less than 0.1 μm, the amount of introduction of movable dislocations into the ferrite becomes small and the yield ratio exceeds 0.7. For this reason, the lower limit of the average grain size of the low temperature transformed phases was made 0.1 μm. Further, if the average grain size of the low temperature transformed phases is excessive, the stretch flange formability deteriorates, so the upper limit was made 1 μm. To reliably obtain this effect, the average grain size of the low temperature transformed phases is more preferably 0.4 to 0.8 μm in range. More preferably, it may be made 0.5 to 0.7 μm.

Note that, for the method of measurement of the grain size of the ferrite phase fraction or low temperature transformed phases, this can be measured based on the LePera method which is described in the [Average Grain Size of Low Temperature Transformed Phases] in the later explained invention examples.

The ratio of the average nano hardnesses of the ferrite phase and the low temperature transformed phases may be made 1.5 to 3.0 (defined as the average nano hardness of the low temperature transformed phases/average nano hardness of the ferrite phase. The nano hardness is measured at a position of a depth of about ¼ of the thickness from the steel sheet surface). If the ratio of hardnesses exceeds 3.0, the stretch flange formability deteriorates. Further, if the ratio of hardnesses is less than 1.5, the concentration of carbon at the low temperature transformed phases becomes insufficient and the introduction of movable dislocations into the ferrite due to the volume expansion of the martensite transformation becomes insufficient. For this reason, the low yield ratio characterizing DP steel can no longer be secured. The lower limit of the ratio of average nano hardnesses is more preferably 1.7, still more preferably 1.9. Further, the upper limit of the ratio of the average nano hardnesses is more preferably 2.8 and still more preferably 2.5.

The "nano hardness" is the ultrasmall loading hardness using a pyramidal indenter which is defined in JIS Z 2255. The measurement load was made 1 mN. The nano hardness sometimes fluctuates due to the measurement load. In the case of the present invention steel, the measurement load is optimally 1 mN in view of the relationship of the grain size of the low temperature transformed phases and the indentation. The nano hardness is defined by the value measured at this load. The average nano hardness is found from the results of measurement of a minimum of 30 points or more, preferably 100 points or so.

Regarding conventional composite structure steel, the above-mentioned PLT 6 and PLT 7 disclose the results of the ratio of hardnesses based on the Vicker's hardness. However, they do not disclose anything, like in the present invention, regarding the effects of the ratio of nano hardnesses between microstructures on the stretch flange formability. The Vicker's hardness is measured by the size of the indentation after removal of load from the indenters, but with the nano hardness, the hardness is found by the depth of penetration of the indenter in the load state. For this reason, this features no deformation seen due to the elastic recovery occurring in measurement of the Vicker's hardness. That is, the nano hardness and the Vicker's hardness clearly differ in measurement methods. For this reason, the effect of the ratio of the nano hardnesses of the ferrite phases and low temperature transformed phases on the stretch flange formability can be said to first appear in composite structure steel of a fine structure.

Here, it was learned that when 80% or more of the nano hardness measurement points of the low temperature transformed phases have nano hardnesses within the range of 1 to 5 times the average nano hardness of the ferrite phase, the stretch flange formability does not deteriorate. In other words, this is because if 20% or more of the nano hardness measurement points of the low temperature transformed phases have nano hardnesses over 5 times the average nano hardness of the ferrite phase, the density of movable dislocations which are introduced into the ferrite near the low temperature transformed phases becomes higher and the fluctuation of the yield strength becomes larger. Therefore, 80% or more of the nano hardness measurement points of the low temperature transformed phases have a nano hardness of 5 times or less of the average nano hardness of the ferrite phase. Further, when 20% or more of the nano hardness measurement points of the low temperature transformed phases have less than 1 time the average nano hardness of the ferrite phase, there is little expansion of volume in the martensite transformation near the low temperature transformed phases and there are less movable dislocations which are introduced into the ferrite. In this case as well, the fluctuations in the yield strength become greater. Therefore, it is prescribed that 80% or more of the measurement points of the nano hardness of the low temperature transformed phases have a nano hardness of 1 time or more of the average nano hardness of the ferrite phase. When the tensile strength is made 780 MPa or more and the fluctuation of the yield strength is reduced, the value may be set to 90%. Preferably, the value is made 92% or more. Note that, the nano hardness of the low temperature transformed phases is measured at least at 10 points or more, if possible 20 points or more.

Next, the limitation of the tensile properties will be explained. The yield ratio was made 0.7 or less because if the above ingredients and microstructure are formed, the result becomes DP steel and this is a condition which shows the low yield ratio characterizing DP steel.

Ten slabs which were cast by the above ingredients were processed to produce hot dipped galvanized steel sheet under the conditions of the above [2] including annealing in the easy annealing temperature region. The difference of the maximum value and the minimum value of the yield strengths of the 10 steel sheets was defined as the fluctuation of the yield strength. When using the chemical ingredients and microstructure of the above [1], this value may be made 60 MPa or less.

Regarding the tensile strength, by making the chemical ingredients and microstructure the ones shown in the above [1], it is possible to obtain a 780 MPa or more tensile strength.

The hot dip galvanization may be the usual hot dip galvanization or may be hot dip galvannealization. The hot dipped galvanized steel sheet which is shown in the above [1] may be produced by any method of production so long as the features of the chemical ingredients and the microstructure are in the ranges which are shown in the above [1]. However, if using the method of production which is shown in the above [2], the sheet can be easily produced. Due to this, the method of production of the same will be explained.

First, the conditions of the hot rolling will be explained. The slab heating temperature was made 1000 to 1350° C. This is because if less than 1000° C., the rolling load becomes higher and, due to the drop in temperature before the final rolling, the prescribed finishing temperature cannot be secured. Further, if over 1350° C., a large amount of scale is formed and causes scale defects.

The final rolling temperature was made Ar3 or more because when making the finishing temperature a temperature lower than this, transformation occurs during the rolling, the rolling load greatly fluctuates, and mis-rolling is caused. Further, at the locations where transformation occurs, the grain size becomes coarser, the microstructure after cold rolling and annealing becomes uneven, and fluctuations in material quality are caused.

The coiling temperature is made 600° C. or less because by making it this temperature or less, the carbide-forming element Ti remains as is in the solid solution state and contributes to the grain size reduction strengthening and dislocation strengthening. Further, there are also the effects that the fluctuations in material quality of the hot rolled sheet strength in the longitudinal direction of the coil become smaller and the fluctuations in the sheet thickness at the time of cold rolling become smaller. Furthermore, at a cooling temperature which is over 600° C., coarse carbides are formed and it becomes difficult for carbides to dissolve into the austenite during the annealing, so the ratio of the nano hardnesses falls and the low yield ratio of the present invention steel can no longer be realized.

The total rolling rate of the cold rolling (hereinafter the total rolling rate of cold rolling being referred to as just the "rolling rate") is made 30 to 70%, while the draft per pass is made 30% or less. If the rolling rate is less than 30%, the structure after annealing becomes coarse and the limitation of the grain size of the low temperature transformed phases which is shown in the above [1] cannot be secured, so the lower limit is made 30%. Further, when the rolling rate exceeds 70%, the drive force behind the recrystallization becomes greater and recrystallization is promoted, so it becomes difficult to secure non-recrystallized ferrite and the strength falls. Therefore, the upper limit was made 70%.

Further, when the draft per pass exceeds 30%, the strong shear band can become thin and the strain near the shear band becomes larger, so the strain profile inside of the steel sheet becomes uneven. At the time of annealing, the ferrite grain size in the high strain region becomes smaller, so the uniformity of the structure at the inside of the steel sheet falls.

Furthermore, small grain size ferrite has a high drive force of grain growth, so the size is strongly affected by the annealing temperature and the fluctuations in the yield strength at the time of manufacture become greater.

Therefore, if making the draft per pass 30% or less, it is possible to suppress the formation of a strong shear band and possible to make the buildup of strain in the steel sheet uniform. If making the draft per pass preferably 25% or less, more preferably 20% or less, most preferably 15% or less, it becomes possible to make the buildup of strain uniform.

The annealing is preferably performed on a continuous hot dip galvanization line. The limitations in the temperature control at that time will be explained.

The heating rate is preferably made an average heating rate of 0.5 to 6° C./sec, preferably 0.5 to 4° C./sec, for at least the temperature range from 600° C. to the later explained annealing temperature. The average heating rate used is the value of the annealing temperature minus 600° C. divided by the time for reaching the annealing temperature from 600° C. (=(annealing temperature−600° C.)/(time required from 600° C. to annealing temperature)). When the average heating rate is high, the time for melting the iron carbides is insufficient and the distribution of carbon in the steel sheet becomes uneven. Further, if the recrystallization of ferrite also becomes insufficient, the strength becomes excessive and the strength-ductility balance falls. Therefore, the heating rate of the upper limit was made 6° C./sec, preferably 4° C./sec. Further, when the heating rate becomes less than 0.5° C./sec, ferrite grain growth proceeds, so the effect of grain size reduction strengthening cannot be expected, the strength becomes insufficient, and, further, the required annealing line length also becomes excessive, so the result is not economical, therefore the lower limit was made 0.5° C./sec.

The annealing is performed by holding the sheet at the annealing temperature of 720° C. to the temperature of the lower of 850° C. or the Ac3 temperature in temperature range, preferably 740 to the temperature of the lower of 800° C. or the Ac3 temperature in temperature range, for 10 seconds or more. When the annealing temperature is less than 720° C., the amount of austenite becomes insufficient, the tensile strength becomes less than 780 MPa, further, the mainly martensite low temperature transformed phases become higher in hardness, and the range of the above [1] is not satisfied. Therefore, the lower limit was made 720° C. Further, by making the lower limit of the annealing temperature 740° C., a sufficient austenite fraction is secured and the strength-ductility balance and stretch flange formability become excellent.

On the other hand, excessive high temperature heating invites a rise of costs, so not only is this not preferable economically, but also the sheet shape at the time of high temperature running becomes inferior, the lifetime of the rolls is reduced, and other trouble is caused, so the upper limit of the peak heating temperature is made the temperature of the lower of 850° C. or the Ac3 temperature. Further, if the annealing temperature is over 850° C., the oxides which form at the steel sheet surface are picked up by the hearth rolls. Sometimes pitting causing indentations at these steel sheets occurs. Further, in the present invention, due to the addition of Ti, recrystallization is possible even at a temperature lower than the Ac3 temperature, so there is no need to raise the temperature to the Ac3 or more (see FIG. 1).

Therefore, the upper limit of the annealing temperature is preferably made the temperature of the lower of 850° C. or the Ac3 temperature. The temperature of the lower of 800° C. or the Ac3 temperature is more preferable. The heat treatment time at this temperature region has to be 10 seconds or more so as to melt the iron carbides. If shorter than this time, not only does the fluctuation of the low temperature transformed phases become greater, but also the grain size becomes excessively fine. On the other hand, if the heat treatment time becomes more than 600 seconds, a rise in cost is invited, so this is not preferable economically.

Regarding the cooling conditions, the temperature range from at least the annealing temperature to 650° C. is cooled by a cooling rate of 5° C./sec or more, preferably 7° C./sec or more, and the temperature range from at least 600° C. to 500° C. is cooled by a cooling rate of 3° C./sec or less, preferably 2° C./sec or less.

First, the cooling rate of the temperature range from the annealing temperature to 650° C. is made faster to suppress the ferrite transformation at 650° C. or more. Due to overcooling of the ferrite, the nucleation sites of the ferrite transformation become greater, the ferrite becomes finer, and the grain size of the austenite which remains at the grain boundary also is observed to become finer. If making this cooling rate less than 5° C./sec, ferrite transformation occurs at a high temperature and as a result the limitation of the average grain size of the low temperature transformed phases which is shown in [1] is not satisfied and the stretch flange formability deteriorates. For this reason, the lower limit was made 5° C./sec. By making this cooling rate 7° C./sec, it is possible to obtain stably refined low temperature transformed phases, so the cooling rate is preferably made 7° C./sec or more.

Further, the cooling rate in the temperature range from 600° C. to 500° C. is made a relatively low speed so as to promote the ferrite transformation which occurs in this temperature region and make the amount of carbon which concentrates at the austenite uniform. When the average cooling rate in this temperature range is over 3° C./sec, the ratio of the nano hardnesses of the low temperature transformed phases to the nano hardness of the ferrite does not satisfy the range limited by the above [1], so the upper limit is made 3° C./sec. If preferably 2° C./sec, there is less fluctuation in the nano hardnesses of the low temperature transformed phases and less fluctuation in the yield strength.

After the sheet is cooled under the above conditions, the sheet is run through the hot dip galvanization bath, then is wiped by gas to adjust the basis weight. In some cases, the sheet is then run through an alloying furnace so as to make the base iron diffuse in the galvanization layer for alloying treatment. The temperature of the alloying furnace is adjusted by the line speed. It is sufficient to select the temperature at which alloying is completed. The temperature usually becomes 460 to 600° C. in range. If 460° C. or less, the alloying becomes slower and the productivity is poor. Further, if over 600°, ferrite-pearlite transformation occurs and the properties deteriorate.

After that, skin pass rolling and tension leveling and other shape correction steps are performed to complete the product. The draft of the skin pass rolling is preferably 0.1 to 1.5% in range. If less than 0.1%, the effect is small and the control also is difficult, so this becomes the lower limit. If over 1.5%, the productivity remarkably falls, so this is made the upper limit. The skin pass may be performed in-line or off-line. Further, the skin pass of the targeted draft may be performed at one time or may be performed divided into several times. Further, trimming etc. may be performed.

The type of the annealing furnace used may be any type such as the NOF-RF type or all radiant tube furnace type. Further, it is also possible to adjust the dew point, atmospheric ingredients, etc. for control of the plateability. Further, it is also possible to perform Ni or other electroplating before the continuous hot dip galvanization line for the purpose of improving the plateability. Further, it is also possible to perform various types of post-treatment for imparting corrosion resistance and other properties after the plating.

EXAMPLES

Next, the present invention will be explained in detail using invention examples.

Invention Example 1

Slabs of the symbols A to AQ which have the chemical ingredients which are shown in Table 1 were hot rolled at the slab heating temperature and final rolling temperature which are shown in Table 2, water cooled at the water cooling zone, then coiled at the temperatures which are shown in Table 2. The final rolling temperatures were the Ar3 point or more in each case. The hot rolled sheets were pickled, then cold rolled to obtain cold rolled sheets. The hot rolled sheet thicknesses, cold rolling rates, and cold rolled sheet thicknesses are shown in Table 2.

After that, the sheets were heat treated and hot dip galvanized by a continuous hot dip galvannealization facility. The hot dip galvanized steel sheets were processed by conditions shown in Table 2 such as the average heating rate from 600° C. to the annealing temperature, the annealing temperature, the holding time, the average cooling rate from the annealing temperature to 650° C., and the average cooling rate from 600° C. to 500° C. The sheets were run through a galvanization bath, then cooled down to room temperature by a 10° C./sec cooling rate down to room temperature, then rolled by a 0.3% draft by skin pass rolling.

Further, cold rolled steel sheets which were produced under the same conditions were annealed under the same conditions, run through a galvanization bath, then run through an alloying furnace for alloying treatment. The alloying treatment temperature was selected in accordance with the line speed from a 460° C. to 600° C. range of temperature. After alloying treatment, the sheet was cooled down to room temperature by a 10° C./sec cooling rate down to room temperature, then rolled by a 0.3% draft by skin pass rolling. The basis weight was made about 50 g/m² at the two sides.

Each of the obtained hot dipped galvanized steel sheets was subjected to a tensile test and measured for the YS (yield strength), TS (tensile strength), and El (elongation). Note that, the yield strength was measured by the 0.2% offset method. The tensile test was performed by obtaining a JIS No. 5 test piece from a 1.4 mm thick sheet in a direction perpendicular to the rolling sheet and evaluating it for tensile properties. From the measurement values, the following properties were evaluated. The results are shown in Table 2.

[Tensile Strength (Stress) (TS)]
The case of a tensile strength of 780 MPa or more is shown as "G" (good) and the case of less than 780 MPa is shown as "P" (poor) in Table 2.

[Yield Ratio]
The case of a yield ratio of 0.7 or less is shown as "G" (good) and the case of over 0.7 is shown as "P" (poor) in Table 2. 0.7 or more is sufficient.

[Strength-Ductility Balance]
The strength-ductility balance (TS×El[MPa·%]) was found and used as an indicator of the press formability. The results are shown in Table 2. The symbols are shown below. 14000 or more is sufficient.

VG (very good): 16000 or more,
G (good): 15000 to less than 16000,
F (fair): 14000 to less than 15000,
P (poor): less than 14000.

[Fluctuations in Yield Strength]
Next, to evaluate the fluctuations in the yield strength, the annealing temperature was changed and hot dipped galvanized steel sheets and hot dipped galvannealed steel sheets were produced. That is, slabs which were cast by the same ingredients were used to prepare sheets under the same hot rolling conditions and cold rolling conditions. At the annealing step, the heating and cooling conditions were made the same but the annealing temperatures were changed in the range of 720 to 800° C. The sheets were run through a plating bath, then cooled down to room temperature by a 10° C./sec cooling rate down to room temperature, then rolled by a 0.3% draft by skin pass rolling or were alloyed, then cooled down to room temperature by a 10° C./sec cooling rate down to room temperature, then rolled by a 0.3% draft by skin pass rolling for the test. The tensile characteristics of these steel sheets were evaluated. At that time, two or more points were measured in each of the ranges of 720 to 730° C., 730 to 740° C., 740 to 750° C., 750° C. to 760° C., 760° C. to 770° C., 770° C. to 780° C., 780° C. to 790° C., and 790° C. to 800° C. Preferably, measurement data is obtained for three or more points. In the present embodiment, a plurality of coils were used for measurement while changing the annealing temperatures. A single coil may also be used for measurement while changing the annealing temperatures. The symbols of the fluctuations in the yield strength are shown below. 60 MPa or less is sufficient.

VG (very good): Difference of maximum value and minimum value of yield strength of 40 MPa or less when making range of annealing temperature 720 to 800° C.,
G (good): Difference of maximum value and minimum value of yield strength of over 40 MPa when making range of annealing temperature 720 to 800° C.,
P (poor): Difference of maximum value and minimum value of yield strength of over 60 MPa when making range of annealing temperature 720 to 800° C.,
The results are shown in Table 2.

Figure 2:
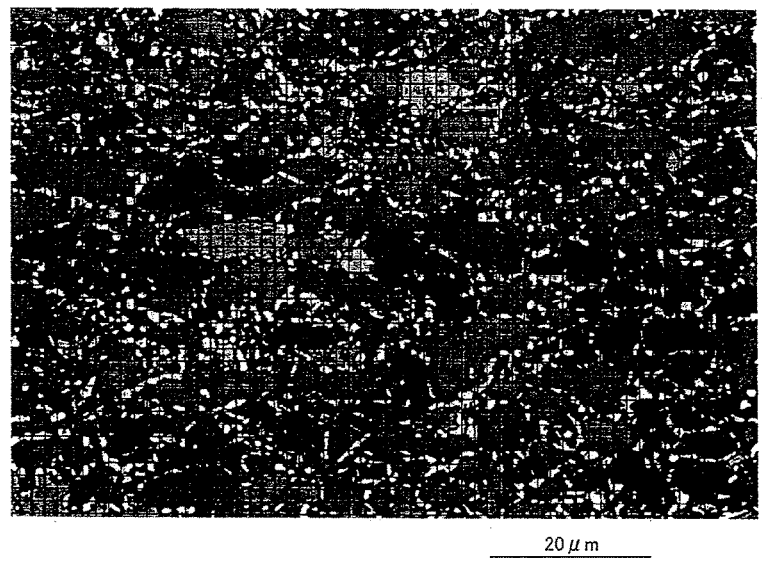
FIG. 2 is a micrograph which shows the structure of steel sheet used when finding the area rate of the low temperature transformed phases in the invention examples.

[Average Grain Size of Low Temperature Transformed Phases]
The microstructure was examined by polishing the sheet thickness cross-section, then using the LePera method for corrosion and observing the cross-section by a power of 1000× by a metal microscope. With LePera corrosion, soft ferrite phases are colored and hard low temperature transformed phases remain white. Due to this, the fraction of the ferrite phase and the average grain size of the low temperature transformed phases were found. The average grain size was determined by using a grid of length 1.5 μm squares and using the point count to find the area of the low temperature transformed phases. The structural photograph and grid are shown in FIG. 2. The number of counted points was 200 points. Further, the number of low temperature transformed phases which were contained in the region for finding the area rate by the point count was counted and the average diameter when making the crystal grains circular were calculated from the area rate and the number. The results are shown in Table 2.

[Strength-Hole Expandability Balance]
The strength-hole expandability balance was evaluated by the stretch flange formability. The stretch flange formability was evaluated using the hole expandability value λ by the hole expandability test which is shown in the Japan Iron and Steel Federation Standard JFST1001-1996. In this case as well, the strength-hole expandability value balance (TS×λ [MPa·%]) was found and used as an indicator of the stretch flange formability. The results are shown in Table 2. The symbols are shown below. 20000 or more is sufficient.
VG (very good): 24000 or more,
G (good): 22000 to less than 24000,
F (fair): 20000 to less than 22000,
P (poor): less than 20000.

[Fluctuations in Nano Hardness]

The nano hardness was measured by the ultrasmall loading hardness method prescribed in JIS Z 2255. The measured load was made 1 mN. The average nano hardness was measured at 100 points. For both the ferrite hardness and the low temperature transformed phase hardness, the steel sheet was cut, the sheet thickness cross-section was polished, then the cross-section was electrolytically corroded so bring out the microstructure, an SPM image was observed, and the ferrite phase and the low temperature transformed phases were judged and the nano hardness measured. The fluctuations in the nano hardness of the low temperature transformed phases are judged by the ratio of the low temperature transformed phases contained in the range of 1 to 5 times the average hardness of the ferrite phase. The results are shown in Table 2. The symbols are shown below. 80% or more is sufficient.
VG (very good): 100%,
G (good): 90% to less than 100%,
F (fair): 80% to less than 90%,
P (poor): less than 80%.

[Spot Weldability]

The spot weldability was evaluated as follows: Electrode (dome type): tip diameter 6 mmϕ, pressing force: 4.3 kN, welding current: current (CE)kA right before occurrence of spatter and (CE+1.5)kA, welding time: 15 cycles, holding time: 10 cycles. After welding, a cross tensile test was performed in accordance with JIS Z 3137. Welding was performed 10 times by a welding current of (CE)kA. The lowest value among those was defined as CTS(CE). As opposed to this, the lowest value of the CTS when welding 10 times by a welding current of the spatter region of (CE+1.5)kA was defined as CTS(CE+1.5). The ratio of these values (=CTS(CE+1.5)/CTS(CE)) was used to evaluate the weldability as follows. 0.7 or more is sufficient.
G (good): 0.8 or more
F (fair): 0.7 to less than 0.8
P (poor): less than 0.7

[Plateability] [Alloying Reactivity]

The plateability and alloying reactivity were evaluated as follows: The symbols which show the plateability are shown below.
G (good): No non-plating,
F (fair): Some non-plating,
P (poor): Much non-plating.

The symbols which show the alloying reactivity are shown below.

G (good): No uneven alloying in surface appearance,
F (fair): Some uneven alloying in surface appearance,
P (poor): Much uneven alloying in surface appearance.

The above results are shown in Table 2. There is no problem so long as not "P".

From Table 2 which summarizes the results, it is learned that the steel sheets of the present invention are excellent in all of the steel sheet shapeability, weldability, and plateability and have little fluctuations in material quality.

Invention Example 2

Slabs of the symbols AR to BA which have the chemical ingredients which are shown in Table 1 were processed under the production conditions which are shown in Table 2 in the same way as in Invention Example 1 to produce hot dipped galvannealed steel sheets. Note that the finishing temperature at the time of hot rolling was the Ar3 point or more in each case. The inventors used this experiment to study the effects of addition of Sn on alloying of the galvanization.

As the method of evaluation, using a continuous hot dip galvanization line, sheets were run under the annealing conditions which are shown in Table 2, then were run through a galvanization bath. The lowest temperature at which alloying sufficiently occurred was found from Experiment Nos. 44 and 49 to which Sn was not added. After that, Experiment Nos. 45 to 48 and 50 to 53 were run to search for the lowest temperature at which alloying sufficiently occurred. The difference from the lowest temperature which was found by Experiment Nos. 44 and 49 was found.

The results are shown together in Table 2. Due to this, it was learned that alloying was promoted by the addition of Sn. However, in Experiment Nos. 48 and 53 where the amounts of Sn were made more than the limit, defects occurred in the hot rolled sheet. Further, the additional evaluation which was performed in Invention Example 1 was also performed and the results are shown in Table 2. Due to these, it is learned that the steel sheets of the present invention are excellent in all of the shapeability, weldability, and plateability and are small in fluctuation of material quality.

Invention Example 3

Slabs of the symbols A, C, and H which have the chemical ingredients which are shown in Table 1 were processed under the production conditions which are shown in Table 2 in the same way as in Invention Example 1 to produce hot dipped galvanized steel sheets and hot dipped galvannealed steel sheets. Note that the finishing temperature at the time of hot rolling was the Ar3 point or more in each case. The inventors used this experiment to study the production conditions of the steel sheets. The results of evaluation are shown in Table 2. Due to this, it is learned that the steel sheets of the present invention are excellent in all of the shapeability, weldability, and plateability and are small in fluctuation of material quality.

TABLE 1

| Steel type | C | Si | Mn | P | S | Al | Ti | Cr | N | Nb | V | W | Mo | Zr | B | Sn | Class |
|---|---|---|---|---|---|---|---|---|---|---|---|---|---|---|---|---|---|
| A | 0.032 | 0.44 | 2.21 | 0.012 | 0.002 | 0.03 | 0.025 | 0.49 | 0.0025 | 0.0002 | 0.0003 | | 0.0004 | 0.0002 | 0.00003 | 0.0013 | Comp. ex. |
| B | 0.061 | 0.44 | 2.21 | 0.012 | 0.002 | 0.03 | 0.025 | 0.49 | 0.0025 | 0.0002 | 0.0003 | | 0.0004 | 0.0002 | 0.00003 | 0.0013 | Inv. ex. |
| C | 0.078 | 0.44 | 2.21 | 0.012 | 0.002 | 0.03 | 0.025 | 0.49 | 0.0025 | 0.0002 | 0.0003 | | 0.0004 | 0.0002 | 0.00003 | 0.0013 | Inv. ex. |
| D | 0.093 | 0.44 | 2.21 | 0.012 | 0.002 | 0.03 | 0.025 | 0.49 | 0.0025 | 0.0002 | 0.0003 | | 0.0004 | 0.0002 | 0.00003 | 0.0013 | Inv. ex. |
| E | 0.123 | 0.44 | 2.21 | 0.012 | 0.002 | 0.03 | 0.025 | 0.49 | 0.0025 | 0.0002 | 0.0003 | | 0.0004 | 0.0002 | 0.00003 | 0.0013 | Comp. ex. |

TABLE 1-continued

| Steel type | C | Si | Mn | P | S | Al | Ti | Cr | N | Nb | V | W | Mo | Zr | B | Sn | Class |
|---|---|---|---|---|---|---|---|---|---|---|---|---|---|---|---|---|---|
| F | 0.154 | 0.44 | 2.21 | 0.012 | 0.002 | 0.03 | 0.025 | 0.49 | 0.0025 | 0.0002 | 0.0003 | | 0.0004 | 0.0002 | 0.00003 | 0.0013 | Comp. ex. |
| G | 0.079 | 0.08 | 2.18 | 0.014 | 0.003 | 0.03 | 0.023 | 0.53 | 0.0038 | 0.0001 | 0.0001 | | 0.0001 | 0.0001 | 0.00003 | 0.0012 | Comp. ex. |
| H | 0.079 | 0.25 | 2.18 | 0.014 | 0.003 | 0.03 | 0.023 | 0.53 | 0.0038 | 0.0001 | 0.0001 | | 0.0001 | 0.0001 | 0.00003 | 0.0012 | Inv. ex. |
| I | 0.078 | 0.45 | 2.18 | 0.014 | 0.003 | 0.03 | 0.023 | 0.53 | 0.0038 | 0.0001 | 0.0001 | | 0.0001 | 0.0001 | 0.00003 | 0.0012 | Inv. ex. |
| J | 0.081 | 0.54 | 2.18 | 0.014 | 0.003 | 0.03 | 0.023 | 0.53 | 0.0038 | 0.0001 | 0.0001 | | 0.0001 | 0.0001 | 0.00003 | 0.0004 | Comp. ex. |
| K | 0.08 | 0.82 | 2.18 | 0.014 | 0.003 | 0.03 | 0.023 | 0.53 | 0.0038 | 0.0001 | 0.0001 | | 0.0001 | 0.0001 | 0.00003 | 0.0012 | Inv. ex. |
| L | 0.079 | 1.25 | 2.18 | 0.014 | 0.003 | 0.03 | 0.023 | 0.53 | 0.0038 | 0.0001 | 0.0001 | | 0.0001 | 0.0001 | 0.00003 | 0.0012 | Comp. ex. |
| M | 0.085 | 0.48 | 1.8 | 0.01 | 0.002 | 0.04 | 0.028 | 0.55 | 0.0031 | 0.0002 | 0.0002 | 0.0001 | 0.0001 | 0.0001 | 0.00003 | 0.0012 | Comp. ex. |
| N | 0.085 | 0.48 | 2.2 | 0.01 | 0.002 | 0.04 | 0.028 | 0.55 | 0.0031 | 0.0002 | 0.0002 | 0.0001 | 0.0001 | 0.0001 | 0.00003 | 0.0012 | Inv. ex. |
| O | 0.084 | 0.48 | 2.3 | 0.01 | 0.002 | 0.04 | 0.028 | 0.55 | 0.0031 | 0.0002 | 0.0002 | 0.0001 | 0.0001 | 0.0001 | 0.00003 | 0.0012 | Inv. ex. |
| P | 0.085 | 0.48 | 2.8 | 0.01 | 0.002 | 0.04 | 0.028 | 0.55 | 0.0031 | 0.0002 | 0.0002 | 0.0001 | 0.0001 | 0.0001 | 0.00003 | 0.0012 | Comp. ex. |
| Q | 0.076 | 0.43 | 2.22 | 0.013 | 0.003 | 0.04 | 0.008 | 0.48 | 0.0028 | 0.0001 | 0.0001 | 0.0001 | 0.0002 | | 0.00003 | 0.0012 | Comp. ex. |
| R | 0.077 | 0.43 | 2.22 | 0.013 | 0.003 | 0.04 | 0.018 | 0.48 | 0.0028 | 0.0001 | 0.0001 | 0.0001 | 0.0002 | | 0.00003 | 0.0012 | Inv. ex. |
| S | 0.078 | 0.43 | 2.22 | 0.013 | 0.003 | 0.04 | 0.021 | 0.48 | 0.0028 | 0.0001 | 0.0001 | 0.0001 | 0.0002 | | 0.00003 | 0.0012 | Inv. ex. |
| T | 0.077 | 0.43 | 2.22 | 0.013 | 0.003 | 0.04 | 0.028 | 0.48 | 0.0028 | 0.0001 | 0.0001 | 0.0001 | 0.0002 | | 0.00003 | 0.0012 | Inv. ex. |
| U | 0.076 | 0.43 | 2.22 | 0.013 | 0.003 | 0.04 | 0.042 | 0.48 | 0.0028 | 0.0001 | 0.0001 | 0.0001 | 0.0002 | | 0.00003 | 0.0012 | Inv. ex. |
| V | 0.078 | 0.43 | 2.22 | 0.013 | 0.003 | 0.04 | 0.068 | 0.48 | 0.0028 | 0.0001 | 0.0001 | 0.0001 | 0.0002 | | 0.00003 | 0.0012 | Comp. ex. |
| W | 0.083 | 0.47 | 2.1 | 0.005 | 0.002 | 0.04 | 0.024 | 0.52 | 0.0033 | | 0.0003 | 0.0002 | 0.0002 | | 0.00003 | 0.0011 | Inv. ex. |
| X | 0.082 | 0.47 | 2.1 | 0.012 | 0.002 | 0.04 | 0.024 | 0.52 | 0.0033 | | 0.0003 | 0.0002 | 0.0002 | | 0.00003 | 0.0003 | Comp. ex. |
| Y | 0.083 | 0.47 | 2.1 | 0.021 | 0.002 | 0.04 | 0.024 | 0.52 | 0.0033 | | 0.0003 | 0.0002 | 0.0002 | | 0.00003 | 0.0011 | Inv. ex. |
| Z | 0.084 | 0.47 | 2.1 | 0.035 | 0.002 | 0.04 | 0.024 | 0.52 | 0.0033 | | 0.0003 | 0.0002 | 0.0002 | | 0.00003 | 0.0011 | Comp. ex. |
| AA | 0.074 | 0.44 | 2.18 | 0.011 | 0.002 | 0.04 | 0.025 | 0.52 | 0.0038 | 0.0003 | | 0.0002 | 0.0003 | 0.0002 | 0.00003 | 0.0011 | Inv. ex. |
| AB | 0.074 | 0.44 | 2.18 | 0.011 | 0.008 | 0.04 | 0.025 | 0.52 | 0.0038 | 0.0003 | | 0.0002 | 0.0003 | 0.0002 | 0.00003 | 0.0011 | Inv. ex. |
| AC | 0.074 | 0.44 | 2.18 | 0.011 | 0.015 | 0.04 | 0.025 | 0.52 | 0.0038 | 0.0003 | | 0.0002 | 0.0003 | 0.0002 | 0.00003 | 0.0011 | Comp. ex. |
| AD | 0.081 | 0.48 | 2.23 | 0.012 | 0.002 | 0.04 | 0.028 | 0.08 | 0.0038 | 0.0002 | 0.0001 | 0.0002 | 0.0003 | 0.0002 | 0.00003 | 0.0011 | Comp. ex. |
| AE | 0.081 | 0.48 | 2.23 | 0.012 | 0.002 | 0.04 | 0.028 | 0.15 | 0.0038 | 0.0002 | 0.0001 | 0.0002 | 0.0003 | 0.0002 | 0.00003 | 0.0011 | Inv. ex. |
| AF | 0.081 | 0.48 | 2.23 | 0.012 | 0.002 | 0.04 | 0.028 | 0.45 | 0.0038 | 0.0002 | 0.0001 | 0.0002 | 0.0003 | 0.0002 | 0.00003 | 0.0011 | Inv. ex. |
| AG | 0.081 | 0.48 | 2.23 | 0.012 | 0.002 | 0.04 | 0.028 | 0.73 | 0.0038 | 0.0002 | 0.0001 | 0.0002 | 0.0003 | 0.0002 | 0.00003 | 0.0011 | Inv. ex. |
| AH | 0.081 | 0.48 | 2.23 | 0.012 | 0.002 | 0.04 | 0.028 | 1.32 | 0.0038 | 0.0002 | 0.0001 | 0.0002 | 0.0003 | 0.0002 | 0.00003 | 0.0011 | Comp. ex. |
| AI | 0.081 | 0.42 | 2.23 | 0.014 | 0.002 | 0.04 | 0.027 | 0.48 | 0.0025 | 0.005 | 0.0003 | 0.0002 | 0.0003 | 0.0001 | 0.00003 | 0.0011 | Comp. ex. |
| AJ | 0.081 | 0.42 | 2.23 | 0.014 | 0.002 | 0.04 | 0.027 | 0.48 | 0.0025 | 0.013 | 0.0003 | 0.0002 | 0.0003 | 0.0002 | 0.00003 | 0.0011 | Comp. ex. |
| AK | 0.081 | 0.42 | 2.23 | 0.014 | 0.002 | 0.04 | 0.027 | 0.48 | 0.0025 | 0.0023 | 0.0003 | 0.0002 | 0.0003 | 0.0002 | 0.00003 | 0.0011 | Comp. ex. |
| AL | 0.079 | 0.42 | 2.23 | 0.014 | 0.002 | 0.04 | 0.027 | 0.48 | 0.0025 | 0.0002 | 0.0032 | 0.0002 | 0.0045 | 0.0002 | 0.00003 | 0.0011 | Comp. ex. |
| AM | 0.093 | 0.42 | 2.23 | 0.014 | 0.002 | 0.04 | 0.027 | 0.48 | 0.0025 | 0.0002 | 0.0003 | 0.0002 | 0.0003 | 0.0032 | 0.00003 | 0.0011 | Comp. ex. |
| AN | 0.089 | 0.42 | 2.23 | 0.014 | 0.002 | 0.04 | 0.027 | 0.48 | 0.0025 | 0.0002 | 0.0003 | 0.0034 | 0.0003 | 0.0032 | 0.00003 | 0.0011 | Comp. ex. |
| AO | 0.077 | 0.42 | 2.23 | 0.014 | 0.002 | 0.04 | 0.027 | 0.48 | 0.0025 | 0.021 | 0.032 | 0.0002 | 0.0003 | 0.0002 | 0.00003 | 0.0011 | Comp. ex. |
| AP | 0.078 | 0.45 | 2.18 | 0.014 | 0.002 | 0.04 | 0.027 | 0.48 | 0.0025 | 0.0002 | 0.0003 | 0.0002 | 0.0003 | 0.0002 | 0.0005 | 0.0011 | Comp. ex. |
| AQ | 0.081 | 0.45 | 2.19 | 0.014 | 0.002 | 0.04 | 0.027 | 0.48 | 0.0025 | 0.0002 | 0.0003 | 0.0002 | 0.0003 | 0.0002 | 0.0015 | 0.0011 | Comp. ex. |
| AR | 0.078 | 0.25 | 2.3 | 0.012 | 0.002 | 0.03 | 0.035 | 0.49 | 0.0025 | 0.0002 | 0.0003 | | 0.0004 | 0.0002 | 0.00003 | 0.0013 | Inv. ex. |
| AS | 0.078 | 0.25 | 2.3 | 0.012 | 0.002 | 0.03 | 0.035 | 0.49 | 0.0025 | 0.0002 | 0.0003 | | 0.0004 | 0.0002 | 0.00003 | 0.028 | Inv. ex. |
| AT | 0.078 | 0.25 | 2.3 | 0.012 | 0.002 | 0.03 | 0.035 | 0.49 | 0.0025 | 0.0002 | 0.0003 | | 0.0004 | 0.0002 | 0.00003 | 0.0081 | Inv. ex. |
| AU | 0.078 | 0.25 | 2.3 | 0.012 | 0.002 | 0.03 | 0.035 | 0.49 | 0.0025 | 0.0002 | 0.0003 | | 0.0004 | 0.0002 | 0.00003 | 0.025 | Inv. ex. |
| AV | 0.082 | 0.25 | 2.3 | 0.012 | 0.002 | 0.04 | 0.035 | 0.5 | 0.0033 | | 0.0001 | | 0.0001 | 0.0002 | 0.00003 | 0.153 | Comp. ex. |
| AW | 0.078 | 0.44 | 2.21 | 0.012 | 0.002 | 0.03 | 0.025 | 0.49 | 0.0025 | 0.0002 | 0.0003 | | 0.0004 | 0.0002 | 0.00003 | 0.0015 | Inv. ex. |
| AX | 0.078 | 0.44 | 2.21 | 0.012 | 0.002 | 0.03 | 0.025 | 0.49 | 0.0025 | 0.0002 | 0.0003 | | 0.0004 | 0.0002 | 0.00003 | 0.0024 | Inv. ex. |
| AY | 0.078 | 0.44 | 2.21 | 0.012 | 0.002 | 0.03 | 0.025 | 0.49 | 0.0025 | 0.0002 | 0.0003 | | 0.0004 | 0.0002 | 0.00003 | 0.0078 | Inv. ex. |
| AZ | 0.078 | 0.44 | 2.21 | 0.012 | 0.002 | 0.03 | 0.025 | 0.49 | 0.0025 | 0.0002 | 0.0003 | | 0.0004 | 0.0002 | 0.00003 | 0.023 | Inv. ex. |
| BA | 0.082 | 0.44 | 2.2 | 0.012 | 0.002 | 0.04 | 0.024 | 0.5 | 0.0033 | | 0.0001 | | 0.0001 | 0.0002 | 0.00003 | 0.132 | Comp. ex. |

TABLE 2

| Exp. no. | Steel type | Steel type class (Table 1) | Slab heating temp. (° C.) | Finishing temp. (° C.) | Coiling temp. (° C.) | Hot rolled sheet thickness (mm) | Cold rolling rate total (%) | 1st pass cold rolling rate (%) | 2nd pass cold rolling rate (%) | 3rd pass cold rolling rate (%) | 4th pass cold rolling rate (%) | 5th pass cold rolling rate (%) | Cold rolled sheet thickness (mm) | Heating rate from 600° C. to annealing temp. (° C./s) | Annealing temp. (° C.) | Ac3 temp. | Holding time (s) | Cooling rate from annealing temp. to 650° C. (° C./s) |
|---|---|---|---|---|---|---|---|---|---|---|---|---|---|---|---|---|---|---|
| 1 | A | Comp. ex. | 1250 | 900 | 550 | 2.8 | 50.0 | 15.0 | 15.0 | 13.5 | 11.0 | 10.0 | 1.4 | 1.9 | 780 | 864 | 120 | 11.0 |
| 2 | B | Inv. ex. | 1250 | 900 | 550 | 2.8 | 50.0 | 15.0 | 13.5 | 11.0 | 10.0 | 15.0 | 1.4 | 1.9 | 780 | 850 | 120 | 11.0 |
| 3 | C | Inv. ex. | 1250 | 900 | 550 | 2.8 | 50.0 | 20.0 | 15.0 | 14.5 | 14.0 | | 1.4 | 1.9 | 780 | 843 | 120 | 11.0 |
| 4 | D | Inv. ex. | 1250 | 900 | 550 | 2.8 | 50.0 | 20.0 | 12.8 | 11.0 | 10.5 | 10.0 | 1.4 | 1.9 | 780 | 838 | 120 | 11.0 |
| 5 | E | Comp. ex. | 1250 | 900 | 550 | 2.8 | 50.0 | 20.0 | 15.0 | 14.5 | 14.0 | | 1.4 | 1.9 | 780 | 829 | 120 | 11.0 |
| 6 | F | Comp. ex. | 1250 | 900 | 550 | 2.8 | 50.0 | 15.0 | 15.0 | 13.5 | 11.0 | 10.0 | 1.4 | 1.9 | 780 | 820 | 120 | 11.0 |
| 7 | G | Comp. ex. | 1150 | 880 | 520 | 2.8 | 50.0 | 15.0 | 15.0 | 13.5 | 11.0 | 10.0 | 1.4 | 1.9 | 775 | 828 | 120 | 11.0 |
| 8 | H | Inv. ex. | 1150 | 880 | 520 | 2.8 | 50.0 | 15.0 | 15.0 | 11.0 | 11.0 | 15.0 | 1.4 | 1.9 | 775 | 835 | 120 | 11.0 |
| 9 | I | Inv. ex. | 1150 | 880 | 520 | 2.8 | 50.0 | 15.0 | 13.5 | 13.5 | 10.0 | 10.0 | 1.4 | 1.9 | 775 | 845 | 120 | 11.0 |
| 10 | J | Comp. ex. | 1150 | 880 | 520 | 2.8 | 50.0 | 20.0 | 12.8 | 11.0 | 10.5 | 15.0 | 1.4 | 1.9 | 775 | 848 | 120 | 11.0 |
| 11 | K | Inv. ex. | 1150 | 880 | 520 | 2.8 | 50.0 | 20.0 | 15.0 | 14.5 | 14.0 | | 1.4 | 1.9 | 850 | 860 | 120 | 11.0 |
| 12 | L | Comp. ex. | 1150 | 880 | 520 | 2.8 | 50.0 | 15.0 | 15.0 | 11.0 | 10.0 | 15.0 | 1.4 | 1.9 | 775 | 880 | 120 | 11.0 |
| 13 | M | Comp. ex. | 1200 | 900 | 570 | 2.8 | 50.0 | 15.0 | 13.5 | 13.5 | 10.0 | | 1.4 | 1.9 | 760 | 854 | 120 | 11.0 |
| 14 | N | Inv. ex. | 1200 | 880 | 570 | 2.8 | 50.0 | 15.0 | 15.0 | 13.5 | 11.0 | 10.0 | 1.4 | 1.9 | 760 | 846 | 120 | 11.0 |
| 15 | O | Inv. ex. | 1200 | 880 | 570 | 2.8 | 50.0 | 15.0 | 15.0 | 11.0 | 11.0 | 10.0 | 1.4 | 1.9 | 760 | 844 | 120 | 11.0 |
| 16 | P | Inv. ex. | 1200 | 900 | 570 | 2.8 | 50.0 | 15.0 | 13.5 | 13.5 | 10.0 | 10.0 | 1.4 | 1.9 | 760 | 834 | 120 | 11.0 |
| 17 | Q | Comp. ex. | 1250 | 900 | 570 | 2.8 | 50.0 | 15.0 | 15.0 | 13.5 | 11.0 | 15.0 | 1.4 | 1.9 | 780 | 844 | 120 | 11.0 |
| 18 | R | Inv. ex. | 1250 | 900 | 570 | 2.8 | 50.0 | 15.0 | 13.5 | 11.0 | 11.0 | 10.0 | 1.4 | 1.9 | 780 | 843 | 120 | 11.0 |
| 19 | S | Inv. ex. | 1250 | 900 | 570 | 2.8 | 50.0 | 20.0 | 12.8 | 11.0 | 11.0 | 10.0 | 1.4 | 1.9 | 780 | 843 | 120 | 11.0 |
| 20 | T | Inv. ex. | 1250 | 900 | 570 | 2.8 | 50.0 | 15.0 | 15.0 | 13.5 | 11.0 | 15.0 | 1.4 | 1.9 | 780 | 843 | 120 | 11.0 |
| 21 | U | Inv. ex. | 1250 | 900 | 570 | 2.8 | 50.0 | 20.0 | 12.8 | 11.0 | 10.5 | | 1.4 | 1.9 | 780 | 844 | 120 | 11.0 |
| 22 | V | Comp. ex. | 1250 | 900 | 570 | 2.8 | 50.0 | 15.0 | 13.5 | 11.0 | 10.0 | 15.0 | 1.4 | 1.9 | 780 | 843 | 120 | 11.0 |
| 23 | W | Inv. ex. | 1100 | 880 | 500 | 4.0 | 50.0 | 15.0 | 15.0 | 13.5 | 11.0 | 10.0 | 2.0 | 1.5 | 770 | 848 | 145 | 7.6 |
| 24 | X | Comp. ex. | 1100 | 880 | 500 | 4.0 | 50.0 | 20.0 | 15.0 | 14.5 | 14.0 | 15.0 | 2.0 | 1.5 | 770 | 848 | 145 | 7.6 |
| 25 | Y | Inv. ex. | 1100 | 880 | 500 | 4.0 | 50.0 | 20.0 | 12.8 | 11.0 | 10.5 | 10.0 | 2.0 | 1.5 | 770 | 848 | 145 | 7.6 |
| 26 | Z | Comp. ex. | 1200 | 880 | 500 | 4.0 | 50.0 | 20.0 | 15.0 | 11.0 | 10.5 | 15.0 | 2.0 | 1.5 | 770 | 847 | 145 | 7.6 |
| 27 | AA | Inv. ex. | 1200 | 880 | 500 | 4.0 | 50.0 | 20.0 | 12.8 | 11.0 | 10.0 | 10.0 | 2.0 | 1.5 | 770 | 848 | 145 | 7.6 |
| 28 | AB | Inv. ex. | 1200 | 880 | 500 | 4.0 | 50.0 | 15.0 | 12.8 | 11.0 | 11.0 | 15.0 | 2.0 | 1.5 | 770 | 848 | 145 | 7.6 |
| 29 | AC | Comp. ex. | 1200 | 880 | 500 | 4.0 | 50.0 | 15.0 | 13.5 | 14.5 | 14.0 | | 2.0 | 1.5 | 770 | 837 | 145 | 7.6 |
| 30 | AD | Comp. ex. | 1150 | 880 | 550 | 4.0 | 50.0 | 50.0 | 15.0 | 13.5 | 11.0 | 10.0 | 2.0 | 1.5 | 770 | 839 | 145 | 7.6 |
| 31 | AE | Inv. ex. | 1150 | 880 | 550 | 4.0 | 50.0 | 15.0 | 13.5 | 11.0 | 10.0 | 15.0 | 2.0 | 1.5 | 770 | 845 | 145 | 7.6 |
| 32 | AF | Inv. ex. | 1150 | 880 | 550 | 4.0 | 50.0 | 15.0 | 12.8 | 11.0 | 10.5 | 10.0 | 2.0 | 1.5 | 770 | 850 | 145 | 7.6 |
| 33 | AG | Inv. ex. | 1150 | 880 | 550 | 4.0 | 50.0 | 20.0 | 12.8 | 11.0 | 10.5 | | 2.0 | 1.5 | 770 | 862 | 145 | 7.6 |
| 34 | AH | Comp. ex. | 1200 | 880 | 550 | 2.4 | 50.0 | 50.0 | | | | | 1.2 | 2.1 | 760 | 842 | 105 | 13.0 |
| 35 | AI | Inv. ex. | 1200 | 900 | 550 | 2.4 | 50.0 | 50.0 | | | | | 1.2 | 2.1 | 760 | 842 | 105 | 13.0 |
| 36 | AJ | Comp. ex. | 1200 | 900 | 550 | 2.4 | 50.0 | 50.0 | | | | | 1.2 | 2.1 | 760 | 843 | 105 | 13.0 |
| 37 | AK | Comp. ex. | 1200 | 900 | 550 | 2.4 | 50.0 | 50.0 | | | | | 1.2 | 2.1 | 760 | 848 | 105 | 13.0 |
| 38 | AL | Comp. ex. | 1200 | 900 | 550 | 2.4 | 50.0 | 50.0 | | | | | 1.2 | 2.1 | 760 | 839 | 105 | 13.0 |
| 39 | AM | Inv. ex. | 1200 | 900 | 550 | 2.4 | 50.0 | 50.0 | | | | | 1.2 | 2.1 | 760 | 838 | 105 | 13.0 |
| 40 | AN | Comp. ex. | 1200 | 900 | 550 | 2.4 | 50.0 | 50.0 | | | | | 1.2 | 2.1 | 760 | 846 | 105 | 13.0 |
| 41 | AO | Comp. ex. | 1200 | 900 | 550 | 2.4 | 50.0 | 50.0 | | | | | 1.2 | 2.1 | 760 | 845 | 105 | 13.0 |
| 42 | AP | Comp. ex. | 1200 | 900 | 550 | 2.4 | 50.0 | 50.0 | | | | | 1.2 | 2.1 | 760 | 844 | 105 | 13.0 |
| 43 | AQ | Comp. ex. | 1200 | 900 | 550 | 2.4 | 50.0 | 50.0 | | | | | 1.2 | 2.1 | 760 | 833 | 105 | 13.0 |
| 44 | AR | Inv. ex. | 1200 | 900 | 550 | 2.4 | 50.0 | 15.0 | 15.0 | 13.5 | 11.0 | 10.0 | 1.2 | 2.1 | 760 | 833 | 105 | 13.0 |

TABLE 2-continued

| | | | | | | | | | | | | | | | | | | |
|---|---|---|---|---|---|---|---|---|---|---|---|---|---|---|---|---|---|---|
| 45 | AS | Inv. ex. | 1200 | 900 | 550 | 2.4 | 50.0 | 20.0 | 12.8 | 11.0 | 10.5 | 10.0 | 1.2 | 2.1 | 760 | 833 | 105 | 13.0 |
| 46 | AT | Inv. ex. | 1200 | 900 | 550 | 2.4 | 50.0 | 15.0 | 13.5 | 11.0 | 10.0 | 15.0 | 1.2 | 2.1 | 760 | 833 | 105 | 13.0 |
| 47 | AU | Inv. ex. | 1200 | 900 | 550 | 2.4 | 50.0 | 15.0 | 15.0 | 13.5 | 11.0 | 10.0 | 1.2 | 2.1 | 760 | 833 | 105 | 13.0 |
| 48 | AV | Comp. ex. | 1200 | 900 | 550 | 2.4 | 50.0 | 20.0 | 12.8 | 11.0 | 10.5 | 10.0 | 1.2 | 2.1 | 760 | 832 | 105 | 13.0 |
| 49 | AW | Inv. ex. | 1200 | 900 | 550 | 2.4 | 50.0 | 20.0 | 15.0 | 14.5 | 14.0 | | 1.2 | 2.1 | 760 | 843 | 105 | 13.0 |
| 50 | AX | Inv. ex. | 1200 | 900 | 550 | 2.4 | 50.0 | 20.0 | 12.8 | 11.0 | 10.5 | 10.0 | 1.2 | 2.1 | 760 | 843 | 105 | 13.0 |
| 51 | AY | Inv. ex. | 1200 | 900 | 550 | 2.4 | 50.0 | 15.0 | 15.0 | 13.5 | 10.0 | 15.0 | 1.2 | 2.1 | 760 | 843 | 105 | 13.0 |
| 52 | AZ | Inv. ex. | 1200 | 900 | 550 | 2.4 | 50.0 | 15.0 | 15.0 | 13.5 | 11.0 | 10.0 | 1.2 | 2.1 | 760 | 843 | 105 | 13.0 |
| 53 | BA | Comp. ex. | 1200 | 900 | 550 | 2.4 | 50.0 | 15.0 | 15.0 | 11.0 | 14.0 | | 1.2 | 2.1 | 760 | 843 | 105 | 13.0 |
| 54 | C | Inv. ex. | 1250 | 900 | 680 | 2.8 | 50.0 | 20.0 | 15.0 | 14.5 | | | 1.4 | 1.9 | 780 | 843 | 120 | 11.0 |
| 55 | C | Inv. ex. | 1250 | 900 | 550 | 2.8 | 50.0 | 26.0 | 24.0 | 11.0 | | 10.0 | 1.4 | 1.9 | 780 | 843 | 120 | 11.0 |
| 56 | C | Inv. ex. | 1250 | 900 | 630 | 2.8 | 50.0 | 20.0 | 12.8 | 11.0 | 10.5 | | 1.4 | 1.9 | 780 | 843 | 120 | 11.0 |
| 57 | C | Inv. ex. | 1250 | 900 | 550 | 1.8 | 20.0 | 11.1 | 10.0 | | | | 1.4 | 1.9 | 780 | 843 | 60 | 11.0 |
| 58 | C | Inv. ex. | 1250 | 900 | 550 | 2.4 | 41.0 | 17.0 | 16.9 | 14.5 | 18.5 | | 0.8 | 3.9 | 780 | 843 | 120 | 19.0 |
| 59 | C | Inv. ex. | 1250 | 900 | 550 | 4.0 | 65.0 | 21.0 | 20.0 | 20.0 | | 15.0 | 1.4 | 0.3 | 780 | 843 | 120 | 11.0 |
| 60 | C | Inv. ex. | 1250 | 900 | 550 | 4.0 | 80.0 | 44.0 | 43.0 | 37.5 | | | 1.4 | 3.5 | 780 | 843 | 120 | 11.0 |
| 61 | C | Inv. ex. | 1250 | 900 | 550 | 2.8 | 50.0 | 15.0 | 13.5 | 11.0 | 10.0 | 15.0 | 1.4 | 5.2 | 780 | 843 | 120 | 11.0 |
| 62 | C | Inv. ex. | 1250 | 900 | 550 | 2.8 | 50.0 | 15.0 | 15.0 | 13.5 | 11.0 | 10.0 | 1.4 | 7.1 | 780 | 843 | 120 | 11.0 |
| 63 | C | Inv. ex. | 1250 | 900 | 550 | 2.8 | 50.0 | 20.0 | 12.8 | 11.0 | 10.5 | 15.0 | 1.4 | 1.9 | 710 | 843 | 120 | 11.0 |
| 64 | C | Inv. ex. | 1250 | 900 | 550 | 2.8 | 50.0 | 15.0 | 15.0 | 13.5 | 11.0 | | 1.4 | 1.9 | 720 | 843 | 120 | 11.0 |
| 65 | C | Inv. ex. | 1250 | 900 | 550 | 2.8 | 50.0 | 15.0 | 13.5 | 11.0 | 10.0 | 15.0 | 1.4 | 1.9 | 745 | 843 | 120 | 11.0 |
| 66 | C | Inv. ex. | 1250 | 900 | 550 | 2.8 | 50.0 | 20.0 | 14.5 | 11.0 | 14.0 | 10.0 | 1.4 | 1.9 | 780 | 843 | 120 | 11.0 |
| 67 | C | Inv. ex. | 1250 | 900 | 550 | 2.8 | 50.0 | 15.0 | 11.0 | 11.0 | 10.5 | 10.0 | 1.4 | 1.9 | 795 | 843 | 120 | 11.0 |
| 68 | C | Inv. ex. | 1250 | 900 | 550 | 2.8 | 50.0 | 15.0 | 13.5 | 11.0 | 11.0 | | 1.4 | 1.9 | 830 | 843 | 120 | 11.0 |
| 69 | C | Inv. ex. | 1250 | 900 | 550 | 2.8 | 50.0 | 15.0 | 15.0 | 13.5 | 11.0 | | 1.4 | 1.9 | 862 | 843 | 120 | 11.0 |
| 70 | C | Inv. ex. | 1250 | 900 | 550 | 2.8 | 50.0 | 20.0 | 15.0 | 11.0 | 10.0 | 15.0 | 1.4 | 1.9 | 780 | 843 | 5 | 11.0 |
| 71 | C | Inv. ex. | 1250 | 900 | 550 | 2.8 | 50.0 | 50.0 | 15.0 | 14.5 | 14.0 | 10.0 | 1.4 | 1.9 | 780 | 843 | 25 | 11.0 |
| 72 | C | Inv. ex. | 1250 | 900 | 550 | 2.8 | 50.0 | 20.0 | 12.8 | 11.0 | 10.5 | 10.0 | 1.4 | 1.9 | 780 | 843 | 120 | 11.0 |
| 73 | C | Inv. ex. | 1250 | 900 | 550 | 2.8 | 50.0 | 15.0 | 15.0 | 13.5 | 11.0 | | 1.4 | 1.9 | 780 | 843 | 300 | 11.0 |
| 74 | C | Inv. ex. | 1250 | 900 | 550 | 2.8 | 50.0 | 50.0 | 15.0 | 11.0 | | 10.0 | 1.4 | 1.9 | 780 | 843 | 120 | 3.2 |
| 75 | C | Inv. ex. | 1250 | 900 | 550 | 2.8 | 50.0 | 20.0 | 12.8 | 11.0 | 10.5 | 10.0 | 1.4 | 1.9 | 780 | 843 | 120 | 5.8 |
| 76 | C | Inv. ex. | 1250 | 900 | 550 | 2.8 | 50.0 | 15.0 | 15.0 | 14.5 | 14.0 | | 1.4 | 1.9 | 780 | 843 | 120 | 8.2 |
| 77 | C | Inv. ex. | 1250 | 900 | 550 | 2.8 | 50.0 | 50.0 | 15.0 | 13.5 | 11.0 | | 1.4 | 1.9 | 780 | 843 | 120 | 11.0 |
| 78 | C | Inv. ex. | 1250 | 900 | 550 | 2.8 | 50.0 | 20.0 | 12.8 | 11.0 | 10.5 | 10.0 | 1.4 | 1.9 | 780 | 843 | 120 | 23.0 |
| 79 | C | Inv. ex. | 1250 | 900 | 550 | 2.8 | 50.0 | 15.0 | 15.0 | 14.5 | 14.0 | 10.0 | 1.4 | 1.9 | 780 | 843 | 120 | 11.0 |
| 80 | C | Inv. ex. | 1250 | 900 | 550 | 2.8 | 50.0 | 15.0 | 12.8 | 11.0 | 10.5 | 10.0 | 1.4 | 1.9 | 780 | 843 | 120 | 11.0 |
| 81 | C | Inv. ex. | 1250 | 900 | 550 | 2.8 | 50.0 | 15.0 | 15.0 | 13.5 | 11.0 | | 1.4 | 1.9 | 780 | 843 | 120 | 11.0 |
| 82 | C | Inv. ex. | 1250 | 900 | 550 | 2.8 | 50.0 | 15.0 | 13.5 | 11.0 | 10.0 | 10.0 | 1.4 | 1.9 | 780 | 843 | 120 | 11.0 |
| 83 | C | Inv. ex. | 1250 | 900 | 550 | 2.8 | 50.0 | 20.0 | 12.8 | 11.0 | 10.5 | 15.0 | 1.4 | 1.9 | 780 | 843 | 120 | 11.0 |
| 84 | C | Inv. ex. | 1250 | 900 | 550 | 2.8 | 50.0 | 15.0 | 15.0 | 13.5 | 11.0 | 10.0 | 1.4 | 1.9 | 780 | 843 | 120 | 11.0 |
| 85 | C | Inv. ex. | 1250 | 900 | 550 | 2.8 | 50.0 | 15.0 | 12.8 | 11.0 | 10.5 | 10.0 | 1.4 | 1.9 | 780 | 843 | 120 | 11.0 |
| 86 | C | Inv. ex. | 1250 | 900 | 630 | 2.8 | 50.0 | 20.0 | 15.0 | 14.5 | 14.0 | | 1.4 | 1.9 | 780 | 843 | 120 | 11.0 |
| 87 | C | Inv. ex. | 1250 | 900 | 680 | 2.8 | 50.0 | 20.0 | 15.0 | 13.5 | 11.0 | 10.0 | 1.4 | 1.9 | 780 | 843 | 120 | 11.0 |
| 88 | H | Inv. ex. | 1150 | 880 | 550 | 2.8 | 50.0 | 15.0 | 12.8 | 11.0 | 11.0 | 10.0 | 1.4 | 1.9 | 780 | 835 | 120 | 11.0 |
| 89 | H | Inv. ex. | 1150 | 880 | 550 | 1.8 | 20.0 | 11.0 | 10.0 | | | | 1.4 | 1.9 | 780 | 835 | 10 | 11.0 |
| 90 | H | Inv. ex. | 1150 | 880 | 550 | 2.4 | 41.0 | 22.4 | 24.0 | 19.0 | | 20.0 | 1.4 | 1.9 | 780 | 835 | 120 | 11.0 |
| 91 | H | Inv. ex. | 1150 | 880 | 630 | 4.0 | 65.0 | 25.0 | 24.0 | 21.0 | | 10.0 | 1.4 | 1.9 | 780 | 835 | 120 | 11.0 |
| 92 | H | Inv. ex. | 1150 | 880 | 550 | 4.0 | 80.0 | 35.0 | 35.0 | 25.0 | | 15.0 | 0.8 | 3.9 | 780 | 835 | 60 | 19.0 |
| 93 | H | Inv. ex. | 1150 | 880 | 550 | 2.8 | 50.0 | 20.0 | 12.8 | 11.0 | 10.5 | 20.0 | 1.4 | 0.3 | 780 | 835 | 120 | 11.0 |
| 94 | H | Inv. ex. | 1150 | 880 | 550 | 2.8 | 50.0 | 15.0 | 13.5 | 11.0 | 10.0 | 10.0 | 1.4 | 1.9 | 780 | 835 | 120 | 11.0 |
| 95 | H | Inv. ex. | 1150 | 880 | 550 | 2.8 | 70.0 | 22.0 | 21.0 | 20.0 | | | 0.84 | 3.5 | 780 | 835 | 120 | 11.0 |
| 96 | H | Inv. ex. | 1150 | 880 | 550 | 2.8 | 50.0 | 24.0 | 15.0 | 14.5 | 14.0 | 20.0 | 1.4 | 5.2 | 780 | 835 | 120 | 11.0 |
| 97 | H | Inv. ex. | 1150 | 880 | 550 | 2.8 | 50.0 | 20.0 | 15.0 | | | | 1.4 | | 780 | 835 | 120 | 11.0 |

TABLE 2-continued

| No. | Type | Class | | | | | | | | | | | | | | | | |
|---|---|---|---|---|---|---|---|---|---|---|---|---|---|---|---|---|---|---|
| 98 | H | Inv. ex. | 1150 | 880 | 550 | 2.8 | 50.0 | 20.0 | 12.8 | 11.0 | 10.5 | 10.0 | 1.4 | 7.1 | 780 | 835 | 120 | 11.0 |
| 99 | H | Inv. ex. | 1150 | 880 | 550 | 2.8 | 50.0 | 15.0 | 15.0 | 13.5 | 11.0 | 10.0 | 1.4 | 1.9 | 710 | 835 | 120 | 11.0 |
| 100 | H | Inv. ex. | 1150 | 880 | 550 | 2.8 | 50.0 | 15.0 | 15.0 | 13.5 | 11.0 | 10.0 | 1.4 | 1.9 | 720 | 835 | 120 | 11.0 |
| 101 | H | Inv. ex. | 1150 | 880 | 550 | 2.8 | 50.0 | 20.0 | 15.0 | 14.5 | 14.0 |  | 1.4 | 1.9 | 745 | 835 | 120 | 11.0 |
| 102 | H | Inv. ex. | 1150 | 880 | 550 | 2.8 | 50.0 | 20.0 | 15.0 | 14.5 | 14.0 | 15.0 | 1.4 | 1.9 | 780 | 835 | 120 | 11.0 |
| 103 | H | Inv. ex. | 1150 | 880 | 550 | 2.8 | 50.0 | 20.0 | 12.8 | 11.0 | 10.0 | 10.0 | 1.4 | 1.9 | 795 | 835 | 120 | 11.0 |
| 104 | H | Inv. ex. | 1150 | 880 | 550 | 2.8 | 50.0 | 15.0 | 13.5 | 13.5 | 10.5 |  | 1.4 | 1.9 | 830 | 835 | 120 | 11.0 |
| 105 | H | Inv. ex. | 1150 | 880 | 550 | 2.8 | 50.0 | 20.0 | 12.8 | 11.0 | 10.5 | 15.0 | 1.4 | 1.9 | 862 | 835 | 120 | 11.0 |
| 106 | H | Inv. ex. | 1150 | 880 | 550 | 2.8 | 50.0 | 15.0 | 15.0 | 13.5 | 11.0 | 10.0 | 1.4 | 1.9 | 780 | 835 | 5 | 11.0 |
| 107 | H | Inv. ex. | 1150 | 880 | 550 | 2.8 | 50.0 | 20.0 | 12.8 | 11.0 | 10.5 |  | 1.4 | 1.9 | 780 | 835 | 25 | 11.0 |
| 108 | H | Inv. ex. | 1000 | 880 | 550 | 2.8 | 50.0 | 50.0 | 15.0 |  |  |  | 1.4 | 1.9 | 780 | 835 | 120 | 3.2 |
| 109 | H | Inv. ex. | 1150 | 880 | 550 | 2.8 | 50.0 | 50.0 | 15.0 |  |  |  | 1.4 | 1.9 | 780 | 835 | 300 | 5.8 |
| 110 | H | Inv. ex. | 1150 | 880 | 550 | 2.8 | 50.0 | 15.0 | 15.0 | 13.5 | 11.0 | 10.0 | 1.4 | 1.9 | 780 | 835 | 120 | 8.2 |
| 111 | H | Inv. ex. | 1150 | 880 | 550 | 2.8 | 50.0 | 20.0 | 15.0 | 14.5 | 14.0 | 10.0 | 1.4 | 1.9 | 780 | 835 | 120 | 11.0 |
| 112 | H | Inv. ex. | 1150 | 880 | 550 | 2.8 | 50.0 | 15.0 | 15.0 | 14.0 | 10.0 | 15.0 | 1.4 | 1.9 | 780 | 835 | 120 | 23.0 |
| 113 | H | Inv. ex. | 1350 | 880 | 550 | 2.8 | 50.0 | 20.0 | 12.8 | 11.0 | 10.5 | 10.0 | 1.4 | 1.9 | 780 | 835 | 120 | 11.0 |
| 114 | H | Inv. ex. | 1150 | 880 | 550 | 2.8 | 50.0 | 50.0 | 15.0 |  |  |  | 1.4 | 1.9 | 780 | 835 | 120 | 11.0 |
| 115 | H | Inv. ex. | 1150 | 880 | 550 | 2.8 | 50.0 | 15.0 | 15.0 | 13.5 | 11.0 | 10.0 | 1.4 | 1.9 | 780 | 835 | 120 | 11.0 |
| 116 | H | Inv. ex. | 1150 | 880 | 550 | 2.8 | 50.0 | 20.0 | 12.8 | 11.0 | 10.5 | 15.0 | 1.4 | 1.9 | 780 | 835 | 120 | 11.0 |
| 117 | H | Inv. ex. | 1150 | 880 | 550 | 2.8 | 50.0 | 15.0 | 15.0 | 14.5 | 14.0 | 10.0 | 1.4 | 1.9 | 780 | 835 | 120 | 11.0 |
| 118 | H | Inv. ex. | 1150 | 880 | 550 | 2.8 | 50.0 | 20.0 | 12.8 | 11.0 | 10.5 | 10.0 | 1.4 | 1.9 | 780 | 835 | 120 | 11.0 |
| 119 | H | Inv. ex. | 1150 | 900 | 680 | 2.8 | 50.0 | 15.0 | 13.5 | 11.0 | 10.5 | 15.0 | 1.4 | 1.9 | 780 | 835 | 120 | 11.0 |
| 120 | H | Inv. ex. | 1250 | 900 | 630 | 2.8 | 50.0 | 20.0 | 12.8 | 11.0 | 11.0 | 10.0 | 1.4 | 1.9 | 780 | 835 | 60 | 19.0 |
| 121 | R | Inv. ex. | 1250 | 900 | 550 | 2.8 | 50.0 | 15.0 | 15.0 | 14.5 | 14.0 |  | 1.4 | 1.9 | 780 | 843 | 120 | 11.0 |
| 122 | R | Inv. ex. | 1250 | 900 | 570 | 1.8 | 50.0 | 20.0 | 7.0 | 6.5 | 8.0 |  | 1.4 | 3.9 | 780 | 843 | 120 | 11.0 |
| 123 | R | Inv. ex. | 1250 | 900 | 570 | 2.4 | 20.0 | 8.0 | 16.0 | 8.0 | 16.0 | 14.0 | 0.8 | 0.3 | 780 | 843 | 120 | 11.0 |
| 124 | R | Inv. ex. | 1350 | 900 | 570 | 4.0 | 41.0 | 17.0 | 24.0 | 16.0 | 16.0 | 24.5 | 1.4 | 3.5 | 780 | 843 | 120 | 11.0 |
| 125 | R | Inv. ex. | 1250 | 900 | 570 | 4.0 | 65.0 | 24.0 | 28.0 | 28.0 | 28.0 | 10.0 | 1.4 | 5.2 | 780 | 843 | 120 | 11.0 |
| 126 | R | Inv. ex. | 1250 | 900 | 570 | 2.8 | 80.0 | 29.0 | 15.0 | 13.5 | 11.0 | 10.0 | 1.4 | 7.1 | 780 | 843 | 120 | 11.0 |
| 127 | R | Inv. ex. | 1250 | 900 | 570 | 2.8 | 50.0 | 15.0 | 12.8 | 11.0 | 11.0 | 15.0 | 1.4 | 1.9 | 710 | 843 | 120 | 11.0 |
| 128 | R | Inv. ex. | 1250 | 900 | 570 | 2.8 | 50.0 | 20.0 | 12.8 | 11.0 | 10.5 | 10.0 | 1.4 | 1.9 | 720 | 843 | 120 | 11.0 |
| 129 | R | Inv. ex. | 1350 | 900 | 570 | 2.8 | 50.0 | 15.0 | 13.5 | 11.0 | 11.0 | 10.0 | 1.4 | 1.9 | 745 | 843 | 120 | 11.0 |
| 130 | R | Inv. ex. | 1250 | 900 | 570 | 2.8 | 50.0 | 20.0 | 13.5 | 11.0 | 10.0 | 10.0 | 1.4 | 1.9 | 780 | 843 | 120 | 11.0 |
| 131 | R | Inv. ex. | 1250 | 900 | 570 | 2.8 | 50.0 | 15.0 | 15.0 | 14.5 | 14.0 |  | 1.4 | 1.9 | 780 | 843 | 120 | 11.0 |
| 132 | R | Inv. ex. | 1250 | 900 | 570 | 2.8 | 50.0 | 20.0 | 12.8 | 11.0 | 10.5 | 10.0 | 1.4 | 1.9 | 780 | 843 | 120 | 11.0 |
| 133 | R | Inv. ex. | 1250 | 900 | 570 | 2.8 | 50.0 | 15.0 | 12.8 | 11.0 | 10.5 | 10.0 | 1.4 | 1.9 | 780 | 843 | 120 | 11.0 |
| 134 | R | Inv. ex. | 1250 | 900 | 570 | 2.8 | 50.0 | 20.0 | 12.8 | 11.0 | 11.0 | 10.0 | 1.4 | 1.9 | 780 | 843 | 120 | 11.0 |
| 135 | R | Inv. ex. | 1100 | 900 | 570 | 2.8 | 50.0 | 20.0 | 15.0 | 14.0 | 14.0 | 15.0 | 1.4 | 1.9 | 780 | 843 | 120 | 11.0 |
| 136 | R | Inv. ex. | 1250 | 900 | 570 | 2.8 | 50.0 | 15.0 | 12.8 | 11.0 | 10.5 | 10.0 | 1.4 | 1.9 | 780 | 843 | 120 | 11.0 |
| 137 | R | Inv. ex. | 1250 | 900 | 570 | 2.8 | 50.0 | 20.0 | 15.0 | 13.5 | 11.0 | 15.0 | 1.4 | 1.9 | 830 | 843 | 120 | 11.0 |
| 138 | R | Inv. ex. | 1250 | 900 | 570 | 2.8 | 50.0 | 15.0 | 13.5 | 11.0 | 10.0 |  | 1.4 | 1.9 | 862 | 843 | 120 | 11.0 |
| 139 | R | Inv. ex. | 1250 | 900 | 570 | 2.8 | 50.0 | 50.0 | 15.0 |  |  | 15.0 | 1.4 | 1.9 | 780 | 843 | 5 | 11.0 |
| 140 | R | Inv. ex. | 1250 | 900 | 570 | 2.8 | 50.0 | 20.0 | 12.8 | 11.0 | 10.5 | 10.0 | 1.4 | 1.9 | 780 | 843 | 25 | 11.0 |
| 141 | R | Inv. ex. | 1250 | 900 | 570 | 2.8 | 50.0 | 15.0 | 13.5 | 11.0 | 10.0 | 15.0 | 1.4 | 1.9 | 780 | 843 | 10 | 11.0 |
| 142 | R | Inv. ex. | 1250 | 900 | 570 | 2.8 | 50.0 | 20.0 | 15.0 | 13.5 | 11.0 | 10.0 | 1.4 | 1.9 | 780 | 843 | 300 | 3.2 |
| 143 | R | Inv. ex. | 1250 | 900 | 570 | 2.8 | 50.0 | 50.0 | 15.0 |  |  |  | 1.4 | 1.9 | 780 | 843 | 120 | 5.8 |
| 144 | R | Inv. ex. | 1250 | 900 | 570 | 2.8 | 50.0 | 15.0 | 15.0 | 14.5 | 14.0 | 10.0 | 1.4 | 1.9 | 780 | 843 | 120 | 8.2 |
| 145 | R | Inv. ex. | 1250 | 900 | 570 | 2.8 | 50.0 | 20.0 | 12.8 | 11.0 | 10.5 | 10.0 | 1.4 | 1.9 | 780 | 843 | 120 | 11.0 |
| 146 | R | Inv. ex. | 1250 | 900 | 570 | 2.8 | 50.0 | 15.0 | 13.5 | 11.0 | 11.0 | 15.0 | 1.4 | 1.9 | 780 | 843 | 120 | 23.0 |
| 147 | R | Inv. ex. | 1250 | 900 | 570 | 2.8 | 50.0 | 20.0 | 15.0 | 13.5 | 11.0 | 10.0 | 1.4 | 1.9 | 780 | 843 | 120 | 11.0 |
| 148 | R | Inv. ex. | 1250 | 900 | 570 | 2.8 | 50.0 | 50.0 | 15.0 |  |  |  | 1.4 | 1.9 | 780 | 843 | 120 | 11.0 |
| 149 | R | Inv. ex. | 1250 | 900 | 570 | 2.8 | 50.0 | 15.0 | 13.5 | 11.0 | 10.5 | 10.0 | 1.4 | 1.9 | 780 | 843 | 120 | 11.0 |
| 150 | R | Inv. ex. | 1250 | 900 | 570 | 2.8 | 50.0 | 20.0 | 12.8 | 11.0 | 10.5 | 10.0 | 1.4 | 1.9 | 780 | 843 | 120 | 11.0 |

TABLE 2-continued

| Exp. no. | Steel type | Cooling rate from 600° C. to 500° C. (° C./s) | α-grain size of annealed sheet (μm) | Ferrite phase fraction (%) | Average grain size of low temp. transformed phases (μm) | Ratio of nano hardness | Fluc. of nano hardness | Yield ratio | Tensile strength | Strength-ductility balance | Strength-hole expandability balance | Pot weldability | Plating wettability | Alloying | Fluc. of yield stress | Remarks | Class |
|---|---|---|---|---|---|---|---|---|---|---|---|---|---|---|---|---|---|
| 151 | R | Inv. ex. | 1250 | 900 | 570 | 2.8 | 30.0 | 14.0 | 10.0 | 9.5 | 11.0 | 2.0 | 1.9 | 780 | 843 | 120 | |
| 152 | R | Inv. ex. | 1250 | 900 | 570 | 2.8 | 50.0 | 15.0 | 15.0 | 13.5 | 11.0 | 1.4 | 1.9 | 780 | 843 | 120 | |
| 1 | A | 1.0 | 16 | 73 | 1.13 | 1.2 | P | P | P | P | P | G | G | G | VG | | Comp. ex. |
| 2 | B | 1.0 | 16 | 72 | 0.45 | 2.3 | G | G | G | G | G | G | G | G | VG | | Inv. ex. |
| 3 | C | 1.0 | 16 | 73 | 0.52 | 2.1 | VG | G | G | VG | VG | G | G | G | VG | | Inv. ex. |
| 4 | D | 1.0 | 16 | 74 | 0.52 | 2.2 | VG | G | G | VG | VG | G | G | G | VG | | Inv. ex. |
| 5 | E | 1.0 | 16 | 71 | 0.57 | 2.1 | G | P | G | VG | G | P | G | G | G | | Comp. ex. |
| 6 | F | 1.0 | 16 | 73 | 0.70 | 2.3 | G | G | G | VG | P | P | G | G | G | | Comp. ex. |
| 7 | G | 1.0 | 14 | 76 | 1.32 | 1.2 | P | G | G | P | P | G | G | G | VG | | Comp. ex. |
| 8 | H | 1.0 | 14 | 77 | 0.42 | 2.8 | F | G | G | F | G | G | G | G | G | | Inv. ex. |
| 9 | I | 1.0 | 13 | 77 | 0.67 | 2.2 | VG | G | G | VG | G | G | G | G | G | | Inv. ex. |
| 10 | J | 1.0 | 13 | 76 | 0.66 | 2.3 | F | G | G | VG | VG | G | G | G | VG | | Inv. ex. |
| 11 | K | 1.0 | 12 | 73 | 0.67 | 2.3 | F | G | G | VG | F | G | G | G | G | | Comp. ex. |
| 12 | L | 1.0 | 11 | 77 | 0.72 | 1.9 | F | G | G | VG | VG | G | G | G | G | | Comp. ex. |
| 13 | M | 1.0 | 16 | 85 | 1.13 | 0.8 | P | P | P | P | P | G | G | G | G | | Comp. ex. |
| 14 | N | 1.0 | 16 | 86 | 0.52 | 1.9 | G | G | G | VG | VG | G | G | G | VG | | Inv. ex. |
| 15 | O | 1.0 | 16 | 88 | 0.55 | 2.0 | VG | G | G | VG | VG | G | G | G | VG | | Inv. ex. |
| 16 | P | 1.0 | 16 | 86 | 1.17 | 1.9 | G | G | G | G | G | P | P | G | P | | Comp. ex. |
| 17 | Q | 1.0 | 18 | 68 | 0.41 | 4.2 | P | P | P | P | P | G | G | G | G | | Comp. ex. |
| 18 | R | 1.0 | 18 | 75 | 0.67 | 2.8 | G | G | G | VG | VG | G | G | G | G | | Inv. ex. |
| 19 | S | 1.0 | 18 | 72 | 0.61 | 2.3 | G | G | G | VG | VG | G | G | G | VG | | Inv. ex. |
| 20 | T | 1.0 | 18 | 73 | 0.58 | 2.2 | VG | G | G | VG | VG | G | G | G | VG | | Inv. ex. |
| 21 | U | 1.0 | 17 | 73 | 0.57 | 2.1 | VG | G | G | VG | VG | G | G | G | G | | Inv. ex. |
| 22 | V | 1.0 | 17 | 64 | 1.19 | 2.1 | G | G | G | P | P | G | G | G | P | | Comp. ex. |
| 23 | W | 0.7 | 12 | 81 | 0.58 | 2.2 | VG | G | G | VG | VG | G | G | G | VG | | Inv. ex. |
| 24 | X | 0.7 | 12 | 83 | 0.59 | 2.1 | G | G | G | VG | VG | G | G | G | VG | | Comp. ex. |
| 25 | Y | 0.7 | 12 | 83 | 0.59 | 2.2 | VG | G | G | VG | VG | G | G | G | VG | | Inv. ex. |
| 26 | Z | 0.7 | 12 | 82 | 0.57 | 2.2 | VG | G | G | VG | VG | G | G | G | VG | | Inv. ex. |
| 27 | AA | 0.7 | 12 | 81 | 0.34 | 1.8 | G | G | G | VG | VG | G | G | G | VG | | Inv. ex. |
| 28 | AB | 0.7 | 12 | 83 | 0.44 | 2.3 | VG | G | G | VG | VG | G | G | G | VG | | Inv. ex. |
| 29 | AC | 0.7 | 12 | 82 | 0.34 | 2.3 | VG | G | G | VG | VG | G | G | G | VG | | Inv. ex. |
| 30 | AD | 0.7 | 16 | 61 | 0.55 | 2.9 | VG | G | G | VG | VG | P | G | P | VG | | Comp. ex. |
| 31 | AE | 0.7 | 16 | 83 | 0.55 | 2.5 | VG | G | G | VG | VG | G | G | G | VG | | Inv. ex. |
| 32 | AF | 0.7 | 16 | 82 | 0.54 | 2.2 | VG | G | G | VG | VG | G | G | G | VG | | Inv. ex. |
| 33 | AG | 0.7 | 16 | 81 | 0.57 | 2.2 | VG | G | G | VG | VG | G | G | G | VG | | Inv. ex. |
| 34 | AH | 1.0 | 16 | 83 | 1.37 | 2.3 | G | G | G | G | G | P | G | G | P | | Comp. ex. |
| 35 | AI | 1.0 | 14 | 64 | 0.55 | 2.3 | VG | P | P | P | P | G | G | G | P | | Comp. ex. |
| 36 | AJ | 1.0 | 14 | 64 | 0.48 | 2.2 | VG | G | G | VG | VG | G | G | G | VG | | Inv. ex. |
| 37 | AK | 1.0 | 14 | 65 | 0.49 | 2.2 | VG | G | G | VG | VG | G | G | G | P | | Comp. ex. |
| 38 | AL | 1.0 | 14 | 64 | 0.52 | 2.3 | G | G | G | G | G | G | G | G | P | | Comp. ex. |
| 39 | AM | 1.0 | 14 | 65 | 0.54 | 2.3 | VG | G | G | P | P | G | G | G | P | | Comp. ex. |
| 40 | AN | 1.0 | 14 | 64 | 0.54 | 2.1 | G | G | G | P | P | G | G | G | P | | Comp. ex. |
| 41 | AO | 1.0 | 14 | 86 | 0.53 | 2.3 | VG | G | G | VG | VG | G | G | G | P | | Comp. ex. |
| 42 | AP | 1.0 | 14 | 84 | 0.52 | 2.1 | G | G | G | VG | VG | G | G | G | P | | Comp. ex. |

TABLE 2-continued

| | | | | | | | | | | | | | | |
|---|---|---|---|---|---|---|---|---|---|---|---|---|---|---|
| 43 | AQ | 1.0 | 14 | 86 | 0.52 | 2.2 | G | G | G | G | G | P | | Comp. ex. |
| 44 | AR | 1.0 | 14 | 84 | 0.57 | 2.3 | F | G | G | G | G | G | | Inv. ex. |
| 45 | AS | 1.0 | 14 | 83 | 0.57 | 2.3 | F | G | G | G | G | G | | Inv. ex. |
| 46 | AT | 1.0 | 14 | 84 | 0.58 | 2.1 | F | G | G | G | G | G | | Inv. ex. |
| 47 | AU | 1.0 | 14 | 84 | 0.59 | 2.3 | F | G | G | G | G | G | | Inv. ex. |
| 48 | AV | 1.0 | 14 | 83 | 0.59 | 2.2 | F | G | G | G | G | G | Defects in hot rolled sheet | Comp. ex. |
| 49 | AW | 1.0 | 14 | 83 | 0.55 | 2.1 | VG | VG | G | G | G | G | | Inv. ex. |
| 50 | AX | 1.0 | 14 | 84 | 0.55 | 2.1 | VG | VG | G | G | G | G | | Inv. ex. |
| 51 | AY | 1.0 | 14 | 83 | 0.53 | 1.9 | VG | VG | G | G | G | G | | Inv. ex. |
| 52 | AZ | 1.0 | 14 | 82 | 0.52 | 2.0 | VG | VG | G | G | G | G | | Inv. ex. |
| 53 | BA | 1.0 | 14 | 83 | 0.55 | 2.0 | G | VG | G | G | G | G | Defects in hot rolled sheet | Comp. ex. |
| 54 | C | 1.0 | 26 | 86 | 0.72 | 1.3 | G | P | P | G | G | G | | Comp. ex. |
| 55 | C | 1.0 | 22 | 84 | 0.52 | 1.1 | G | P | P | G | G | G | | Comp. ex. |
| 56 | C | 1.0 | 16 | 73 | 0.52 | 2.1 | VG | VG | G | G | G | VG | | Inv. ex. |
| 57 | C | 1.0 | 23 | 72 | 1.40 | 2.3 | G | G | G | G | G | G | | Comp. ex. |
| 58 | C | 1.0 | 18 | 73 | 0.78 | 2.1 | VG | P | G | G | G | VG | | Inv. ex. |
| 59 | C | 1.0 | 12 | 73 | 0.43 | 1.9 | VG | VG | P | G | G | VG | | Inv. ex. |
| 60 | C | 1.6 | 7 | 72 | 1.72 | 1.8 | G | G | G | G | G | P | | Comp. ex. |
| 61 | C | 1.0 | 21 | 73 | 1.52 | 1.7 | VG | G | G | G | G | VG | | Inv. ex. |
| 62 | C | 1.0 | 16 | 73 | 0.52 | 2.1 | VG | P | P | P | G | G | | Comp. ex. |
| 63 | C | 1.0 | 15 | 72 | 0.52 | 2.1 | VG | P | P | P | G | G | | Comp. ex. |
| 64 | C | 1.0 | 15 | 73 | 0.52 | 2.1 | VG | F | F | P | G | G | | Inv. ex. |
| 65 | C | 1.0 | 15 | 78 | 1.12 | 3.6 | G | P | F | F | G | VG | | Inv. ex. |
| 66 | C | 1.0 | 12 | 95 | 0.08 | 2.5 | G | F | P | F | G | G | | Comp. ex. |
| 67 | C | 1.0 | 13 | 89 | 0.62 | 2.1 | VG | F | F | F | G | VG | | Comp. ex. |
| 68 | C | 1.0 | 14 | 88 | 0.52 | 2.1 | G | G | G | G | G | G | | Inv. ex. |
| 69 | C | 1.0 | 16 | 75 | 0.52 | 2.1 | G | VG | G | G | G | VG | | Inv. ex. |
| 70 | C | 1.0 | 17 | 73 | 0.73 | 1.8 | VG | VG | VG | VG | G | G | | Inv. ex. |
| 71 | C | 1.0 | 19 | 71 | 0.73 | 1.8 | F | VG | VG | F | G | G | Pitting | Comp. ex. |
| 72 | C | 1.0 | 22 | 61 | 0.73 | 1.8 | VG | P | P | VG | G | VG | Deterioration of sheet shape | Comp. ex. |
| 73 | C | 1.0 | 11 | 83 | 0.08 | 4.0 | P | P | P | P | G | P | | Comp. ex. |
| 74 | C | 1.0 | 13 | 78 | 0.52 | 2.1 | VG | VG | G | VG | G | VG | | Inv. ex. |
| 75 | C | 1.0 | 16 | 75 | 0.52 | 2.1 | VG | VG | G | VG | G | VG | | Inv. ex. |
| 76 | C | 1.0 | 20 | 73 | 1.80 | 2.1 | P | P | P | P | G | P | | Comp. ex. |
| 77 | C | 1.0 | 16 | 74 | 0.76 | 2.3 | G | G | G | G | G | G | | Inv. ex. |
| 78 | C | 1.0 | 16 | 73 | 0.62 | 2.0 | VG | VG | G | VG | G | VG | | Inv. ex. |
| 79 | C | 1.0 | 16 | 73 | 0.52 | 1.9 | VG | VG | G | VG | G | VG | | Inv. ex. |
| 80 | C | 1.0 | 16 | 74 | 0.42 | 1.8 | G | G | G | G | G | G | | Inv. ex. |
| 81 | C | 1.0 | 16 | 73 | 0.55 | 2.1 | G | G | G | G | G | G | | Inv. ex. |
| 82 | C | 3.8 | 16 | 74 | 0.55 | 2.2 | P | P | P | P | G | P | | Comp. ex. |
| 83 | C | 2.5 | 16 | 73 | 0.53 | 1.9 | G | G | G | G | G | G | | Inv. ex. |
| 84 | C | 1.4 | 16 | 75 | 0.57 | 2.2 | VG | VG | G | G | G | VG | | Inv. ex. |
| 85 | C | 1.0 | 16 | 73 | 0.57 | 1.9 | VG | VG | G | G | G | G | | Inv. ex. |
| 86 | C | 0.5 | 16 | 74 | 0.61 | 2.1 | VG | VG | G | G | G | VG | | Inv. ex. |

TABLE 2-continued

| # | Type | | | | | | | | | | | Pitting | Deterioration of sheet shape | |
|---|---|---|---|---|---|---|---|---|---|---|---|---|---|---|
| 87 | H | 1.0 | 27 | 84 | 0.84 | 1.4 | F | P | P | P | G | G | P | Comp. ex. |
| 88 | H | 1.0 | 23 | 83 | 0.63 | 1.3 | F | F | P | P | G | G | G | Comp. ex. |
| 89 | H | 1.0 | 16 | 90 | 0.53 | 2.1 | F | G | G | G | G | G | G | Inv. ex. |
| 90 | H | 1.0 | 24 | 73 | 1.50 | 2.3 | G | F | G | VG | P | G | G | Comp. ex. |
| 91 | H | 1.0 | 19 | 74 | 0.66 | 2.1 | F | G | G | VG | G | G | G | Inv. ex. |
| 92 | H | 1.0 | 13 | 75 | 0.41 | 1.9 | F | G | G | VG | G | G | G | Inv. ex. |
| 93 | H | 1.6 | 7 | 72 | 1.22 | 1.7 | F | G | P | G | P | G | P | Comp. ex. |
| 94 | H | 1.0 | 21 | 73 | 1.44 | 1.7 | F | P | G | G | VG | G | VG | Comp. ex. |
| 95 | H | 1.0 | 16 | 73 | 0.43 | 2.1 | F | G | VG | VG | G | G | G | Inv. ex. |
| 96 | H | 1.0 | 16 | 74 | 0.44 | 2.1 | F | G | VG | VG | G | G | G | Inv. ex. |
| 97 | H | 1.0 | 16 | 75 | 0.45 | 2.1 | F | P | F | P | G | G | VG | Comp. ex. |
| 98 | H | 1.0 | 15 | 77 | 1.07 | 3.7 | G | P | F | P | G | G | G | Comp. ex. |
| 99 | H | 1.0 | 12 | 93 | 0.09 | 2.4 | F | P | G | F | G | G | VG | Inv. ex. |
| 100 | H | 1.0 | 13 | 87 | 0.62 | 2.2 | F | F | G | VG | G | G | VG | Inv. ex. |
| 101 | H | 1.0 | 14 | 84 | 0.49 | 2.0 | F | G | G | VG | G | G | G | Inv. ex. |
| 102 | H | 1.0 | 16 | 71 | 0.50 | 2.2 | F | F | G | VG | G | G | G | Inv. ex. |
| 103 | H | 1.0 | 17 | 74 | 0.49 | 2.1 | F | G | G | F | G | G | G | Comp. ex. |
| 104 | H | 1.0 | 20 | 73 | 0.64 | 1.9 | F | F | G | VG | G | G | G | Inv. ex. |
| 105 | H | 1.0 | 22 | 63 | 0.71 | 1.9 | G | G | P | VG | G | G | VG | Comp. ex. |
| 106 | H | 1.0 | 12 | 88 | 0.09 | 3.8 | F | P | P | P | G | G | P | Comp. ex. |
| 107 | H | 1.0 | 13 | 83 | 0.49 | 2.2 | F | F | VG | VG | G | G | G | Inv. ex. |
| 108 | H | 1.0 | 16 | 75 | 0.48 | 2.2 | F | G | VG | VG | G | G | G | Inv. ex. |
| 109 | H | 1.0 | 20 | 74 | 1.27 | 2.2 | F | P | VG | P | G | G | P | Comp. ex. |
| 110 | H | 1.0 | 17 | 75 | 1.60 | 2.1 | F | P | VG | F | G | G | P | Comp. ex. |
| 111 | H | 1.0 | 17 | 74 | 0.88 | 2.2 | F | G | VG | VG | G | G | G | Inv. ex. |
| 112 | H | 1.0 | 17 | 74 | 0.62 | 2.1 | F | G | VG | VG | G | G | G | Inv. ex. |
| 113 | H | 1.0 | 16 | 74 | 0.43 | 2.1 | F | G | VG | VG | G | G | G | Inv. ex. |
| 114 | H | 1.0 | 16 | 75 | 1.00 | 2.0 | F | P | VG | P | G | G | P | Comp. ex. |
| 115 | H | 3.8 | 16 | 74 | 0.52 | 2.0 | F | P | VG | VG | G | G | G | Inv. ex. |
| 116 | H | 2.5 | 16 | 75 | 0.49 | 1.9 | F | P | VG | VG | G | G | G | Inv. ex. |
| 117 | H | 1.4 | 16 | 74 | 0.48 | 2.3 | F | P | VG | VG | G | G | G | Inv. ex. |
| 118 | H | 3.0 | 16 | 71 | 0.44 | 3.0 | F | P | VG | F | G | G | G | Comp. ex. |
| 119 | H | 0.5 | 16 | 74 | 0.61 | 1.2 | P | P | VG | VG | G | G | G | Inv. ex. |
| 120 | H | 1.0 | 26 | 87 | 0.75 | 1.0 | F | P | P | VG | G | G | G | Inv. ex. |
| 121 | H | 1.0 | 22 | 85 | 0.82 | 2.3 | F | P | P | P | G | G | P | Comp. ex. |
| 122 | R | 1.0 | 16 | 75 | 0.64 | 1.0 | G | G | VG | G | G | G | G | Inv. ex. |
| 123 | R | 1.0 | 26 | 74 | 1.50 | 2.3 | F | G | VG | VG | G | G | G | Inv. ex. |
| 124 | R | 1.0 | 20 | 73 | 0.81 | 2.2 | F | P | VG | VG | G | G | G | Inv. ex. |
| 125 | R | 1.0 | 13 | 74 | 0.44 | 2.1 | F | P | G | F | G | G | G | Comp. ex. |
| 126 | R | 1.0 | 8 | 75 | 1.49 | 2.0 | F | P | G | VG | G | G | P | Comp. ex. |
| 127 | R | 1.6 | 23 | 75 | 1.55 | 1.6 | F | G | G | VG | G | G | G | Inv. ex. |
| 128 | R | 1.0 | 18 | 74 | 0.54 | 1.6 | F | P | G | F | G | G | VG | Comp. ex. |
| 129 | R | 1.0 | 17 | 75 | 0.55 | 2.3 | F | G | G | VG | G | G | G | Inv. ex. |
| 130 | R | 1.0 | 17 | 74 | 0.54 | 2.1 | F | G | G | G | G | G | G | Inv. ex. |
| 131 | R | 1.0 | 17 | 73 | 1.26 | 2.2 | F | P | G | P | G | G | VG | Comp. ex. |

TABLE 2-continued

| | | | | | | | | | | | | | |
|---|---|---|---|---|---|---|---|---|---|---|---|---|---|
| 132 | R | 1.0 | 13 | 94 | 0.11 | 3.7 | G | P | P | F | P | G | VG | Comp. ex. |
| 133 | R | 1.0 | 14 | 85 | 0.61 | 2.4 | F | G | G | F | F | G | G | Inv. ex. |
| 134 | R | 1.0 | 15 | 84 | 0.55 | 2.2 | F | G | G | VG | VG | G | G | Inv. ex. |
| 135 | R | 1.0 | 18 | 74 | 0.51 | 2.2 | F | G | G | VG | VG | G | G | Inv. ex. |
| 136 | R | 1.0 | 19 | 73 | 0.52 | 2.3 | F | G | G | VG | VG | G | G | Inv. ex. |
| 137 | R | 1.0 | 21 | 71 | 0.82 | 1.7 | F | G | G | VG | F | G | G | Inv. ex. |
| 138 | R | 1.0 | 24 | 63 | 0.83 | 1.7 | F | G | G | P | VG | G | VG | Comp. ex. Deterioration of sheet shape |
| 139 | R | 1.0 | 13 | 88 | 0.07 | 3.9 | P | P | G | VG | P | G | P | Comp. ex. |
| 140 | R | 1.0 | 14 | 81 | 0.55 | 2.3 | F | G | G | VG | VG | G | G | Inv. ex. |
| 141 | R | 1.0 | 13 | 90 | 0.52 | 2.2 | F | G | G | VG | VG | G | G | Inv. ex. |
| 142 | R | 1.0 | 22 | 73 | 0.55 | 2.3 | F | G | G | VG | VG | G | G | Inv. ex. |
| 143 | R | 1.0 | 18 | 74 | 1.90 | 2.3 | P | P | G | VG | P | G | P | Comp. ex. |
| 144 | R | 1.0 | 18 | 73 | 0.82 | 2.4 | F | G | G | VG | VG | G | G | Inv. ex. |
| 145 | R | 1.0 | 18 | 74 | 0.66 | 2.1 | F | G | G | VG | F | G | G | Inv. ex. |
| 146 | R | 3.0 | 18 | 72 | 0.55 | 1.8 | F | G | G | VG | VG | G | G | Inv. ex. |
| 147 | R | 1.0 | 17 | 74 | 1.00 | 1.7 | F | G | G | VG | F | G | G | Inv. ex. |
| 148 | R | 3.8 | 18 | 73 | 0.56 | 2.1 | P | G | G | VG | P | G | P | Comp. ex. |
| 149 | R | 2.5 | 18 | 74 | 0.51 | 2.1 | F | G | G | VG | F | G | G | Inv. ex. |
| 150 | R | 1.4 | 18 | 73 | 0.57 | 2.1 | F | G | G | VG | VG | G | G | Inv. ex. |
| 151 | R | 1.0 | 18 | 74 | 0.59 | 2.3 | F | G | G | VG | VG | G | G | Inv. ex. |
| 152 | R | 0.5 | 18 | 73 | 0.63 | 3.0 | F | G | G | VG | VG | G | G | Inv. ex. |

INDUSTRIAL APPLICABILITY

The present invention stably and inexpensively provides steel sheets with a high strength of a tensile strength of 780 MPa and an excellent shapeability which are suitable for chassis parts which are used for an automobile. It promises to greatly contribute to the lighter weight of automobiles and is extremely high in effect in industry.

The invention claimed is:

1. A high strength hot dipped galvanized steel sheet comprising, as ingredients of the steel, by mass %,
C: 0.05 to 0.1%,
Si: 0.1 to 1.0%,
Mn: 2.0% to 2.5%,
Al: 0.02 to 0.1%,
Ti: 0.01 to 0.05%,
Cr: 0.1 to 1.0%,
Sn: 0.0010 to 0.1%, and
a balance of Fe and unavoidable impurities,
as the unavoidable impurities,
P: 0.03% or less,
S: 0.01% or less,
Nb: 0.001% or less,
V: 0.001% or less,
W: 0.001% or less,
Mo: 0.001% or less,
Zr: 0.001% or less,
B: 0.0001% or less,
having a microstructure containing, by area %, 70-90% of ferrite and the balance being comprised of a low-temperature transformation phase containing martensite,
having an average grain size of the low temperature transformed phase of 0.1 to 1 μm,
having a ratio of average nano hardnesses of the ferrite phase and the low temperature transformed phase of 1.5 to 3.0, and
having a nano hardness of the low temperature transformed phase at 80% or more of the measurement points of 1 to 5 times the average nano hardness of the ferrite phase.

2. The high strength hot dipped galvanized steel sheet as set forth in claim 1, wherein the steel contains, by mass %, Sn: 0.002 to 0.1%.

3. The high strength hot dipped galvanized steel sheet as set forth in claim 1, wherein the steel contains, by mass %, Sn: 0.005 to 0.1%.

* * * * *